(12) United States Patent
Elshafie et al.

(10) Patent No.: US 11,909,681 B2
(45) Date of Patent: Feb. 20, 2024

(54) MULTIPLE DATA CHANNEL BASED CHANNEL STATE INFORMATION REPORTS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/403,799

(22) Filed: Aug. 16, 2021

(65) Prior Publication Data

US 2023/0059139 A1 Feb. 23, 2023

(51) Int. Cl.
*H04L 5/00* (2006.01)
*H04B 7/06* (2006.01)
*H04W 24/08* (2009.01)

(52) U.S. Cl.
CPC ......... *H04L 5/0048* (2013.01); *H04B 7/0626* (2013.01); *H04L 5/0055* (2013.01); *H04W 24/08* (2013.01)

(58) Field of Classification Search
None
See application file for complete search history.

(56) References Cited

U.S. PATENT DOCUMENTS

2019/0150016 A1* 5/2019 Kittichokechai ..... H04L 1/0001 370/252
2020/0136763 A1 4/2020 Lee et al.

FOREIGN PATENT DOCUMENTS

WO WO-2018044849 A1 * 3/2018 ............ H04L 1/0011

OTHER PUBLICATIONS

International Search Report and Written Opinion—PCT/US2022/036568—ISA/EPO—dated Oct. 31, 2022.

* cited by examiner

*Primary Examiner* — Adnan Baig
(74) *Attorney, Agent, or Firm* — Holland & Hart LLP

(57) ABSTRACT

Methods, systems, and devices for wireless communications are described. A user equipment (UE) may receive, from a base station, control signaling that may identify a configuration for channel state information reporting associated with both a first target block error rate and a second target block error rate. The UE may receive one or more reference signals associated with the channel state information reporting. Further, the UE may transmit, to the base station, the channel state information reporting that may include first channel state information for the first target block error rate and second channel state information for the second target block error rate. In some examples, each of the first channel state information and the second channel state information may be based on the received reference signals.

26 Claims, 17 Drawing Sheets

MULTIPLE DATA CHANNEL BASED CHANNEL STATE INFORMATION REPORTS

FIELD OF TECHNOLOGY

The following relates to wireless communications, including the use of multiple data channel-based channel state information reports.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may perform channel quality measurements and may further report channel quality measurements to another device (e.g., a base station). The wireless device may implement targets or thresholds to determine whether a channel is adequate for communications (e.g., a threshold value for a block error rate) and may utilize such thresholds without regard to any particular scenario. Conventional methods for such channel quality measurement and reporting schemes may be deficient.

SUMMARY

The described techniques relate to improved methods, systems, devices, and apparatuses that support multiple data channel-based channel state information reports. Generally, the described techniques provide for CSI reports associated with one or more block error rates (BLERs). A user equipment (UE) may receive, from a base station, control signaling identifying a configuration for channel state information reporting associated with both a first target block error rate and a second target block error rate. The UE may receive reference signals associated with the channel state information reporting. Further, the UE may transmit, to the base station, the channel state information reporting that includes first channel state information for the first target block error rate and second channel state information for the second target block error rate, each of the first channel state information and the second channel state information based at least in part on the received reference signals.

A method for wireless communications at a user equipment (UE) is described. The method may include receiving, from a base station, control signaling identifying a configuration for channel state information reporting associated with both a first target block error rate and a second target block error rate, receiving reference signals associated with the channel state information reporting, and transmitting, to the base station, the channel state information reporting that includes first channel state information for the first target block error rate and second channel state information for the second target block error rate, each of the first channel state information and the second channel state information based on the received reference signals.

An apparatus for wireless communications at a UE is described. The apparatus may include a processor, memory coupled with the processor, and instructions stored in the memory. The instructions may be executable by the processor to cause the apparatus to receive, from a base station, control signaling identifying a configuration for channel state information reporting associated with both a first target block error rate and a second target block error rate, receive reference signals associated with the channel state information reporting, and transmit, to the base station, the channel state information reporting that includes first channel state information for the first target block error rate and second channel state information for the second target block error rate, each of the first channel state information and the second channel state information based on the received reference signals.

Another apparatus for wireless communications at a UE is described. The apparatus may include means for receiving, from a base station, control signaling identifying a configuration for channel state information reporting associated with both a first target block error rate and a second target block error rate, means for receiving reference signals associated with the channel state information reporting, and means for transmitting, to the base station, the channel state information reporting that includes first channel state information for the first target block error rate and second channel state information for the second target block error rate, each of the first channel state information and the second channel state information based on the received reference signals.

A non-transitory computer-readable medium storing code for wireless communications at a UE is described. The code may include instructions executable by a processor to receive, from a base station, control signaling identifying a configuration for channel state information reporting associated with both a first target block error rate and a second target block error rate, receive reference signals associated with the channel state information reporting, and transmit, to the base station, the channel state information reporting that includes first channel state information for the first target block error rate and second channel state information for the second target block error rate, each of the first channel state information and the second channel state information based on the received reference signals.

In some examples of the method, apparatuses, and non-transitory computer-readable medium described herein, receiving the control signaling indicating the configuration may include operations, features, means, or instructions for receiving control signaling identifying a first set of thresholds for the first target block error rate for the channel state information reporting and a second set of thresholds for the second target block error rate for the channel state information reporting.

Some examples of the method, apparatuses, and non-transitory computer-readable medium described herein may further include operations, features, means, or instructions for receiving control signaling identifying the first target block error rate and the second target block error rate.

Some examples of the method, apparatuses, and non-transitory computer-readable medium described herein may further include operations, features, means, or instructions for receiving control signaling identifying a set of indices and a set of target block error rates, each index of the set of indices indicating one or more a set of multiple target block error rates of the set of target block error rates, where receiving the control signaling indicating the configuration for the channel state information reporting may include operations, features, means, or instructions for receiving control signaling identifying an index of the set of indices, the index corresponding to the first target block error rate and the second target block error rate of the set of target block error rates.

Some examples of the method, apparatuses, and non-transitory computer-readable medium described herein may further include operations, features, means, or instructions for receiving control signaling identifying a set of indices, each index of the set of indices corresponding to a combination of a positive or negative acknowledgment, a first quantization level associated with the first target block error rate, and a second quantization level associated with the second target block error rate, receiving a data signal from the base station, and selecting, based on the received reference signals and the received data signal, an index of the set of indices corresponding to the first quantization level, first quantization level corresponding to the first channel state information based on the received reference signals, the second quantization level corresponding to the second channel state information based on the received reference signals, and one of a positive or negative acknowledgment associated with the received data signal, where the first channel state information and the second channel state information include the selected index.

Some examples of the method, apparatuses, and non-transitory computer-readable medium described herein may further include operations, features, means, or instructions for receiving control signaling identifying a set of indices including a first subset of indices and second subset of indices, where each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate, receiving a data signal from the base station, the received data signal associated with one of the positive acknowledgement or the negative acknowledgement, and selecting, based on the received reference signals and the one of the positive acknowledgement or the negative acknowledgement, an index of the set of indices corresponding to the positive acknowledgement and the first quantization level corresponding to the first channel state information based on the received reference signals or corresponding to the negative acknowledgement and the second quantization level corresponding to the second channel state information based on the received reference signals, where one of the first channel state information or the second channel state information includes the selected index.

Some examples of the method, apparatuses, and non-transitory computer-readable medium described herein may further include operations, features, means, or instructions for selecting a first quantization level as the first channel state information based on the first target block error rate and one or more block error rate thresholds and selecting a second quantization level as the second channel state information based on the second target block error rate and the one or more block error rate thresholds.

Some examples of the method, apparatuses, and non-transitory computer-readable medium described herein may further include operations, features, means, or instructions for determining a signal to interference and noise ratio associated with the reference signal, mapping the signal to interference and noise ratio to one or more of a set of multiple channel state information curves, and selecting an indication of the first channel state information and an indication of the second channel state information based on the mapping.

Some examples of the method, apparatuses, and non-transitory computer-readable medium described herein may further include operations, features, means, or instructions for receiving a request for the first channel state information and the second channel state information, the request received in a radio resource control message, a medium access control control element message, or a downlink control information message.

In some examples of the method, apparatuses, and non-transitory computer-readable medium described herein, the reference signal may be a channel state information reference signal or a demodulation reference signal.

A method for wireless communications at a base station is described. The method may include transmitting, to a UE, control signaling identifying a configuration for channel state information reporting associated with both a first target block error rate and a second target block error rate, transmitting reference signals associated with the channel state information reporting, and receiving, from the UE, the channel state information reporting that includes first channel state information for the first target block error rate and second channel state information for the second target block error rate, each of the first channel state information and the second channel state information based on the reference signals.

An apparatus for wireless communications at a base station is described. The apparatus may include a processor, memory coupled with the processor, and instructions stored in the memory. The instructions may be executable by the processor to cause the apparatus to transmit, to a UE, control signaling identifying a configuration for channel state information reporting associated with both a first target block error rate and a second target block error rate, transmit reference signals associated with the channel state information reporting, and receive, from the UE, the channel state information reporting that includes first channel state information for the first target block error rate and second channel state information for the second target block error rate, each of the first channel state information and the second channel state information based on the reference signals.

Another apparatus for wireless communications at a base station is described. The apparatus may include means for transmitting, to a UE, control signaling identifying a configuration for channel state information reporting associated with both a first target block error rate and a second target block error rate, means for transmitting reference signals associated with the channel state information reporting, and means for receiving, from the UE, the channel state information reporting that includes first channel state information for the first target block error rate and second channel state information for the second target block error rate, each of the first channel state information and the second channel state information based on the reference signals.

A non-transitory computer-readable medium storing code for wireless communications at a base station is described. The code may include instructions executable by a processor to transmit, to a UE, control signaling identifying a configuration for channel state information reporting associated with both a first target block error rate and a second target block error rate, transmit reference signals associated with the channel state information reporting, and receive, from the UE, the channel state information reporting that includes first channel state information for the first target block error rate and second channel state information for the second target block error rate, each of the first channel state information and the second channel state information based on the reference signals.

In some examples of the method, apparatuses, and non-transitory computer-readable medium described herein, transmitting the control signaling indicating the configuration may include operations, features, means, or instructions for transmitting, the UE, control signaling identifying a first set of thresholds for the first target block error rate for the channel state information reporting and a second set of thresholds for the second target block error rate for the channel state information reporting.

Some examples of the method, apparatuses, and non-transitory computer-readable medium described herein may further include operations, features, means, or instructions for transmitting control signaling identifying the first target block error rate and the second target block error rate.

Some examples of the method, apparatuses, and non-transitory computer-readable medium described herein may further include operations, features, means, or instructions for transmitting, to the UE, control signaling identifying a set of indices and a set of target block error rates, each index of the set of indices indicating one or more a set of multiple target block error rates of the set of target block error rates, where transmitting the control signaling indicating the configuration for the channel state information reporting may include operations, features, means, or instructions for transmitting control signaling identifying an index of the set of indices, the index corresponding to the first target block error rate and the second target block error rate of the set of target block error rates.

Some examples of the method, apparatuses, and non-transitory computer-readable medium described herein may further include operations, features, means, or instructions for transmitting, to the UE, control signaling identifying a set of indices, each index of the set of indices corresponding to a combination of a positive or negative acknowledgment, a first quantization level associated with the first target block error rate, and a second quantization level associated with the second target block error rate.

Some examples of the method, apparatuses, and non-transitory computer-readable medium described herein may further include operations, features, means, or instructions for transmitting, to the UE, control signaling identifying a set of indices including a first subset of indices and second subset of indices, where each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate.

Some examples of the method, apparatuses, and non-transitory computer-readable medium described herein may further include operations, features, means, or instructions for transmitting, to the UE, a request for the first channel state information and the second channel state information, the request transmitted in a radio resource control message, a medium access control control element message, or a downlink control information message.

DETAILED DESCRIPTION

In wireless communications, a user equipment (UE) may determine a channel quality using a reference signal received from another device (e.g., a base station). Such approaches may utilize targets or thresholds to determine whether a particular channel quality is adequate for communications (e.g., a threshold value for a block error rate (BLER)). However, conventional techniques are limited in that they may only consider a single channel quality target, which may not be applicable to different scenarios. For example, a BLER may be utilized in a scenario with particular requirements for the BLER without consideration for the particular scenario, which may require different BLER. One example is an enhanced mobile broadband (eMBB) scenario, which may have different BLER requirements or targets than an ultra-reliable and low latency communications (URLLC) scenario. However, current approaches do not allow for multiple reports, metrics, or targets for various scenarios.

To improve channel quality reporting for various scenarios, a UE may be configured (e.g., by a base station) to report channel state information (CSI) for multiple scenarios based on the measurement of a reference signal common for both scenarios. As such, the UE may receive a reference signal that may be associated with multiple target BLERs (e.g., a BLER for an eMBB scenario and a BLER for a URLLC scenario). The UE may make measurements of the reference signal and determine CSI associated with the multiple target BLERs. The UE may then transmit an indication of the CSI associated with the first BLER and another CSI indication associated with the second BLER (e.g., to a base station). In some examples, the UE may receive (e.g., from a base station) an indication of an index associated with various options for reporting the CSI indications (e.g., quantization levels for the CSI indications, selection of a target BLER, a positive acknowledgement (ACK) or a negative acknowledgement (NACK), or other factors). In this way, reporting of CSI associated with multiple different scenarios (e.g., different BLER targets or thresholds) may be achieved, and channel quality reporting may be improved.

Aspects of the disclosure are initially described in the context of wireless communications systems. Aspects of the disclosure are further described by an example communications system and process flows. Aspects of the disclosure are further illustrated by and described with reference to apparatus diagrams, system diagrams, and flowcharts that relate to multiple data channel-based channel state information reports (e.g., for both URLLC and eMBB).

Figure 1:
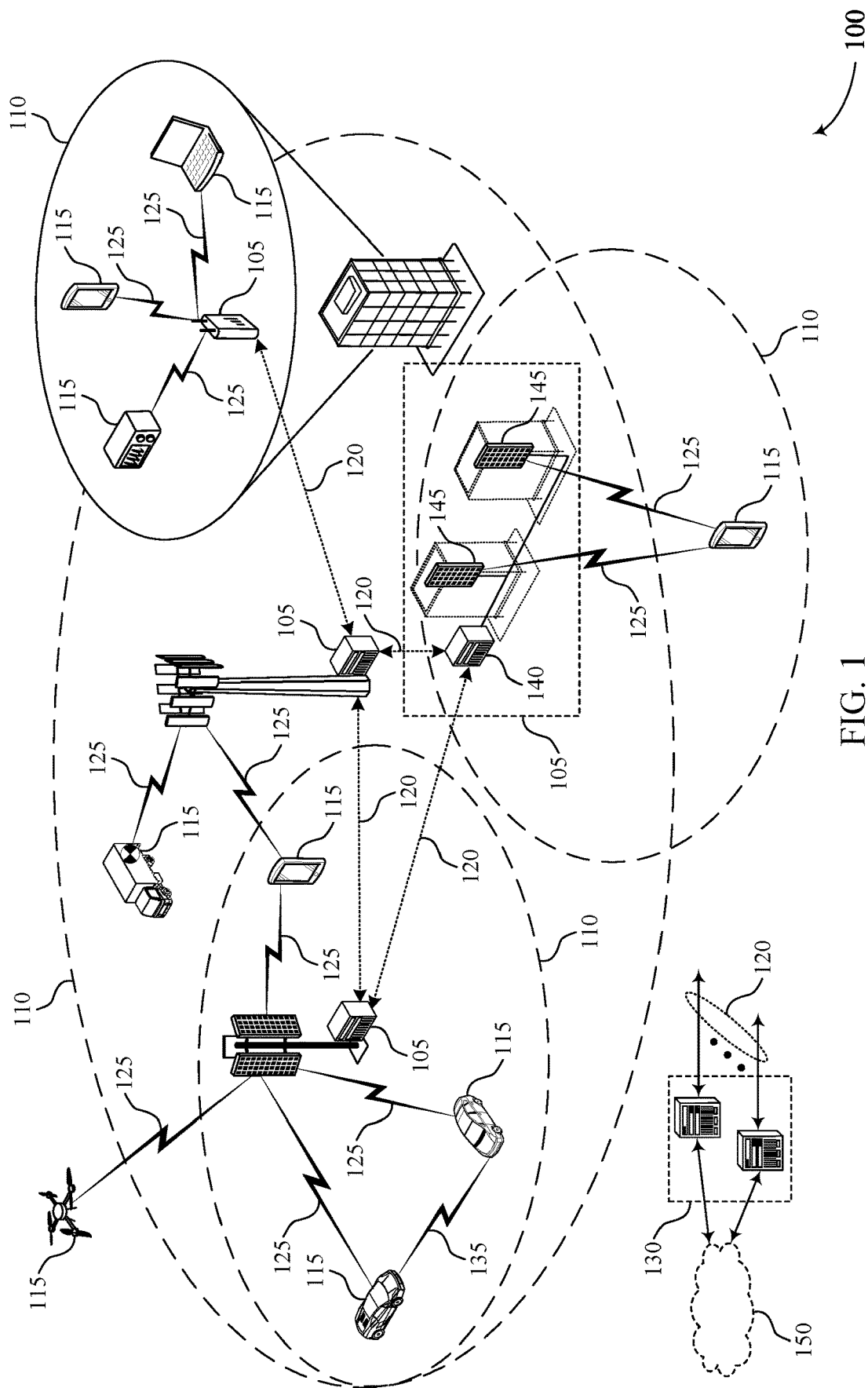
FIG. 1 illustrates an example of a wireless communications system that supports multiple data channel-based channel state information reports in accordance with aspects of the present disclosure.

FIG. 1 illustrates an example of a wireless communications system 100 that supports multiple data channel-based channel state information reports in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To improve channel quality reporting for various scenarios, the UE 115 may be configured (e.g., by a base station 105) to report CSI for multiple scenarios (e.g., for eMBB and URLLC) based on the measurement of a reference signal common for both scenarios. For example, the UE 115 may receive control signaling from the base station 105, and the control signaling may include or identify a configuration for such CSI reporting. In some examples, such a configuration may include, identify, or be associated with one or more target BLERs. Additionally, the UE 115 may receive a reference signal that may be associated with multiple target BLERs (e.g., a BLER for an eMBB scenario and a BLER for a URLLC scenario) or with the CSI reporting generally. Though discussed in the context of target BLERs for eMBB or URLLC, different target BLERs for different communication scenarios, modes, or types may be used in accordance with the techniques described herein. For example, the UE 115 may receive one or more of a CSI reference signal (CSI-RS), a demodulation reference signal (DMRS), or both, and the UE 115 may make measurements of the reference signal and determine CSI associated with the multiple target BLERs. The UE 115 may then transmit the CSI reporting (e.g., in one or more CSI reports or transmissions) to the base station 105. For example, the UE 115 may transmit an indication of the CSI associated with the first BLER (e.g., for an eMBB scenario) and another CSI indication associated with the second BLER (e.g., for a URLLC scenario). Additionally or alternatively, the UE 115 may receive (e.g., from a base station) an indication of an index associated with various options for reporting the CSI indications (e.g., quantization levels for the CSI indications, selection of a target BLER, an ACK or a NACK, or other factors). In this way, reporting of CSI associated with multiple different scenarios (e.g., different BLER targets or thresholds) may be achieved, and channel quality reporting may be improved.

Figure 2:
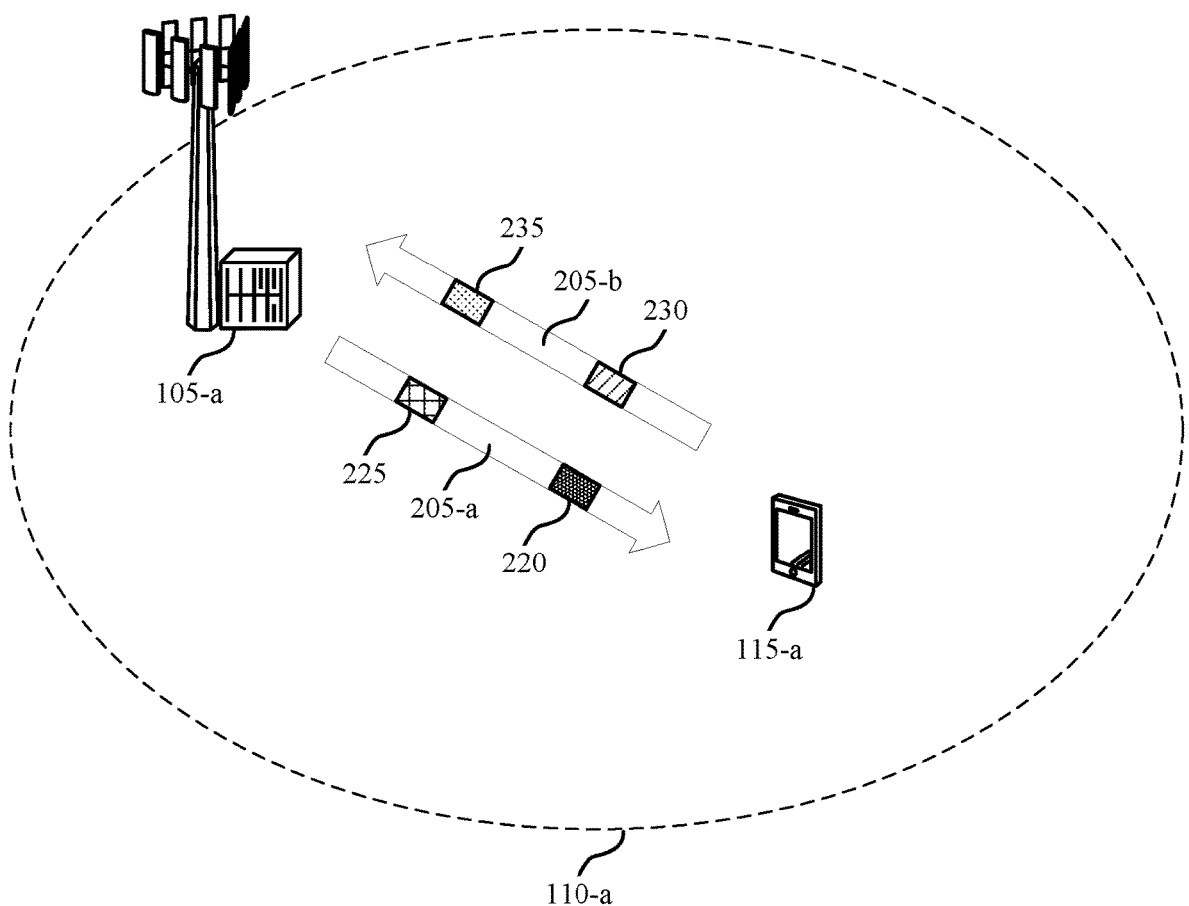
FIG. 2 illustrates an example of a system that supports multiple data channel-based channel state information reports in accordance with aspects of the present disclosure.

FIG. 2 illustrates an example of a wireless communications system 200 that supports multiple data channel-based channel state information reports in accordance with aspects of the present disclosure. The wireless communications system 200 may include a base station 105-a that may be an example of the base station 105 discussed in relation to FIG. 1. The wireless communications system 200 may include UE 115-a that may be an example of UE 115 discussed in relation to FIG. 1. In some examples, the base station 105-a and the UE 115 a may be located in a geographic coverage area 110-a. The base station 105-a and UE 115-a may communicate via one or more downlink communication links 205-a and one or more uplink communication links 205-b. The UE 115-a may receive control signaling 220 (e.g., from the base station 105-a) in accordance with the approaches described herein. The UE 115-a may further receive one or more reference signals 225 (e.g., from the base station 105-a) in accordance with the approaches described herein. The UE 115-a may transmit a first CSI 230, a second CSI 235, or both, in accordance with the approaches described herein.

In the course of operations, a UE 115-a may measure and report channel quality for one or more channels of communication with another device. In some examples, such measurement and reporting of channel quality or conditions may include or be associated with various wireless communications scenarios. For example, in some instances, the UE 115-a may operate in an eMBB scenario at times and may operate in a URLLC scenario at other times. Different scenarios may imply different conditions in which the UE 115-a may operate, and the UE 115-a may perform different operations or procedures in different scenarios. As such, and in accordance with the approaches described herein, the UE 115-a may perform channel measurement and quality or condition reporting differently for these different scenarios.

In some examples, the UE 115-a may receive control signaling 220 from the base station 105-a. In some examples, the control signaling 220 may include or identify information for different operations scenarios. For example, the control signaling 220 may include or be associated with a configuration for CSI reporting. In some examples, some such configurations may be associated with one or metrics, measurements, targets, or other parameters for the CSI reporting. For example, the configuration may be associated with BLERs, such as a first target BLER and a second target BLER. Such target BLERs may be associated with different operating scenarios (e.g., eMBB, URLLC, or other operating scenarios).

In some examples, the UE 115-a may receive one or more reference signals. In some examples, the UE 115-a may receive a single reference signal, and in other examples, the UE 115-a may receive multiple reference signals. Further, the one or more reference signals may be received from another wireless device (e.g., base station 105-a), and the one or more reference signals may be of various types (e.g., a CSI reference signal (CSI-RS), a demodulation reference signal (DMRS), or other type or reference signal). The UE 115-a may utilize the one or more reference signals to provide a basis for performing channel measurement, estimation, or analysis. For example, the UE 115-a may compare the received reference signal with one or more expected characteristics of the received reference signal to determine or obtain a channel measurement, one or more channel conditions, or other information associated with the channel.

In some examples, the UE 115-a may transmit CSI reporting (e.g., to the base station 105-a). The UE 115-a may transmit CSI reporting that may be based on or include results of a channel measurement or condition obtained by the UE 115-a. In some examples, the UE 115-a may transmit CSI reporting that may include the first CSI 230 (e.g., associated with a first target BLER) and second CSI 235 (e.g., associated with a second target BLER). These target BLERs may be the same target BLERs that were received by the UE 115-a in control signaling. In some examples, the transmitted CSI (e.g., the first CSI 230 and the second CSI 235) may be used for future transmissions in one or more operation scenarios. For example, the first CSI 230 may be used in connection with one or more communications in an eMBB scenario, and the second CSI 235 may be used in connection with one or more communications in a URLLC scenario. In this way, the UE 115-a may report CSI for multiple scenarios and associated with multiple target metrics (e.g., the target BLERs discussed herein).

Figure 3:
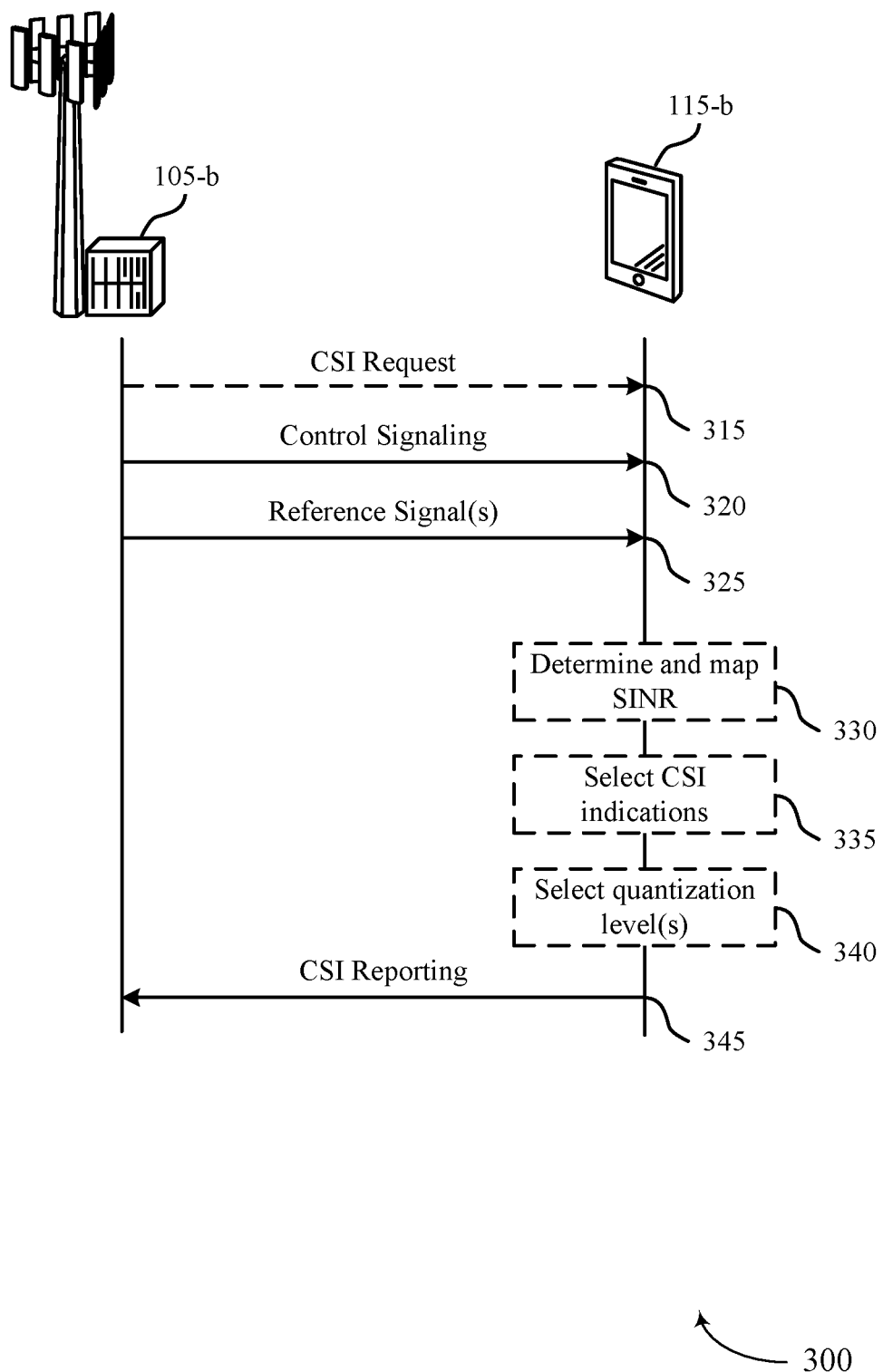
FIG. 3 illustrates an example of a process flow that supports multiple data channel-based channel state information reports in accordance with aspects of the present disclosure.

FIG. 3 illustrates an example of a process flow 300 that supports multiple data channel-based channel state information reports in accordance with aspects of the present disclosure. The process flow 300 may implement various aspects of the present disclosure described with reference to FIGS. 1-2. The process flow 300 may include a base station 105-b, and a UE 115-b, which may be examples of base station 105 and UE 115 as described with reference to FIGS. 1-2. In some examples, the UE 115-b may be configured with procedures, instructions, or other information for CSI reporting for multiple operation scenarios.

In the following description of the process flow 300, the operations between the base station 105-b and the UE 115-b may be performed in different orders or at different times. Some operations may also be left out of the process flow 300, or other operations may be added. Although the base station 105-b and the UE 115-b are shown performing the operations of the process flow 300, some aspects of some operations may also be performed by the base station 105-b, the UE 115-b, one or more other wireless devices, or any combination thereof.

At 315, the UE 115-b may receive a request for the first CSI and the second CSI. The request may be received in a radio resource control (RRC) message, a medium access control control element (MAC-CE) message, or a downlink control information (DCI) message. For example, the base station 105-*b* may request CSI (e.g., a modulation and coding scheme (MCS), a channel quality indicator (CQI), or both) from the UE 115-*b*. In some examples, such a request may be made for one or more target BLERs. In some examples, the one or more target BLERs may be associated with one or more communication or operation scenarios.

At 320, the UE 115-*b* may receive, from a base station, control signaling that may identify a configuration for CSI reporting associated with both a first target block error rate and a second target block error rate. In some examples, the UE 115-*b* may receive control signaling identifying a first set of thresholds for the first target block error rate for the CSI reporting and a second set of thresholds for the second target block error rate for the CSI reporting.

In some examples, the UE 115-*b* may receive control signaling that may identify the first target block error rate and the second target block error rate. For example, in some cases the base station 105-*b* may explicitly signal one or more BLER targets to the UE 115-*b*. In some cases, such signaling may indicate to the UE 115-*b* that the UE 115-*b* is to prepare one or more CSI reports based on the explicitly signaled one or more BLER targets. In some examples, such CSI reports may be PDSCH-based CSI reports. In some examples, the base station 105-*b* may signal a quantity of BLER targets that the UE 115-*b* is to use for CSI reporting. For example, the base station 105-*b* may signal to the UE 115-*b* a number indicating the number of CSI reports that the UE 115-*b* is to prepare based on the same number of target BLERs. Such signaling indicating a number of CSI reports, a number of BLERs, or both, may be RRC signaling, MAC-CE signaling, or other signaling.

Additionally or alternatively, the UE 115-*b* may be configured with a list of target BLERs or BLER requirements, and each target BLER or group of target BLERs may be associated with an index. The base station 105-*b* may transmit an indication of one or more indices, and the UE 115-*b* may therefore determine or select one or more target BLERs based on the transmitted indications of one or more indices. For example, if the base station 105-*b* transmits an index of 010, the UE 115-*b* may select a target BLER associated with the transmitted index of 010, and may further prepare a CSI report to be transmitted to the base station 105-*b* based on the determined or selected target BLER or BLER requirement.

At 325, the UE 115-*b* may receive one or more reference signals associated with the CSI reporting. Such reference signals may be CSI-RS, DMRS, or other reference signals.

At 330, the UE 115-*b* may determine a signal to interference and noise ratio (SINR) associated with the reference signal. For example, the UE 115-*b* may determine, select, or otherwise obtain a signal strength associated with the reference signal. The UE 115-*b* may further determine, select, or otherwise obtain signal strength associated with interference, noise, or both. The UE 115-*b* may then compare the signal strength associated with the reference signal and the signal strength associated with interference, noise, or both to determine, calculate, select, or otherwise obtain the SINR.

In some examples, the UE 115-*b* may further map the SINR to one or more of a plurality of CSI curves. For example, after determining an SINR, the UE 115-*b* may use one or more linkcurves to map the SINR onto indications of channel quality (e.g., an MCS, a CQI, or other indication of channel quality). For example, the UE 115-*b* may map the computed SINR into a first CQI or MCS for a first BLER target and may further map the computed SINR into a second CQI or MCS for a second BLER target.

At 335, the UE 115-*b* may select an indication of the first CSI and an indication of the second CSI based on the mapping. For example, the UE 115-*b*, after mapping the SINR onto a first CQI or MCS and a second CQI or MCS, the UE 115-*b* may then select an indication of the first CQI or MCS and an indication of the second CQI or MCS based on the mapping. For example, the UE 115-*b* may be provided with information about a plurality of CSI indications (e.g., CQI or MCS indications), and the plurality of CSI indications may cover a range of both SINR and BLER. Based on the combination of the SINR and BLER, the UE 115-*b* may select a CSI indication that most closely aligns (or best satisfies one or more associated selection criteria) with the combination of the SINR and BLER. In some examples, the selected indications may be associated with one or more operation or communication scenarios (e.g., an eMBB scenario, a URLLC scenario, or both).

In some examples, the UE 115-*b* may prepare the one or more CSI reports associated with one or more target BLERs. This may be done by simply concatenating one or more bits associated with a positive acknowledgement (ACK) or negative acknowledgement (NACK), the first CSI indication associated with the first BLER, and the second CSI indication associated with the second BLER.

In some examples, the UE 115-*b* may modify one or more of the elements of the bits to be transmitted in or as part of the CSI reporting. For example, instead of transmitting the CSI indications for the first BLER and the second BLER, the UE 115-*b* may employ a differential reporting scheme. In such a scheme, the UE 115-*b* may report the difference between a scheduled CSI indication (e.g., MCS_sch) and the selected CSI indication (e.g., MCS_mes_BLER1) for a target BLER. To continue the example, the UE 115-*b* may then concatenate the ACK or NACK, the first differential indication (e.g., MCS_sch−MCS_mes_BLER1), and the second differential indication (e.g., MCS_sch−MCS_mes_BLER2). In some examples, a number of bits for each CSI indication for each target BLER may also be received by the UE 115-*b* in control signaling. For example, the UE 115-*b* may receive indications of a number of bits in which each CSI indication (e.g., MCS or CQI) is to be reported.

At 340, the UE 115-*b* may select a first quantization level, which may be selected as the first CSI based on the first target block error rate and one or more block error rate thresholds. Similarly, the UE 115-*b* may select a second quantization level, which may be selected as the second CSI based on the second target block error rate and the one or more block error rate thresholds. In some examples, the first quantization level may be the same as the second quantization level. Alternatively, the first quantization level may be different than the second quantization level.

In some examples, the UE 115-*b* may define multiple quantization levels that may be used. For example, the UE 115-*b* may receive one or more quantization levels in control signaling (e.g., from the base station 105-*b*) or the UE 115-*b* may be otherwise configured with the one or more quantization levels. In some examples, the UE 115-*b* may select one or more of the quantization levels based on the absolute CSI indications, or the UE 115-*b* may select one or more of the quantization levels based on the differential measurements or values between the absolute CSI indications and the selected CSI indications. In some examples, the UE 115-*b* may determine, select, or otherwise obtain the one or more thresholds (e.g., the UE 115-*b* may receive the one or more thresholds through RRC signaling, MAC-CE signaling, or other control signaling). The UE 115-*b* may then use the one or more thresholds to determine one or more quantization levels that may be used. For example, the one or more thresholds may then define ranges of values, and, depending on where the absolute or differential value fall within such ranges, a quantization level associated with one or more ranges may be selected for each CSI indication.

At 345, the UE 115-b may transmit, to the base station, the CSI reporting that may include first CSI for the first target block error rate and second CSI for the second target block error rate, and each of the first CSI and the second CSI may be based on the received reference signals.

Figure 4:
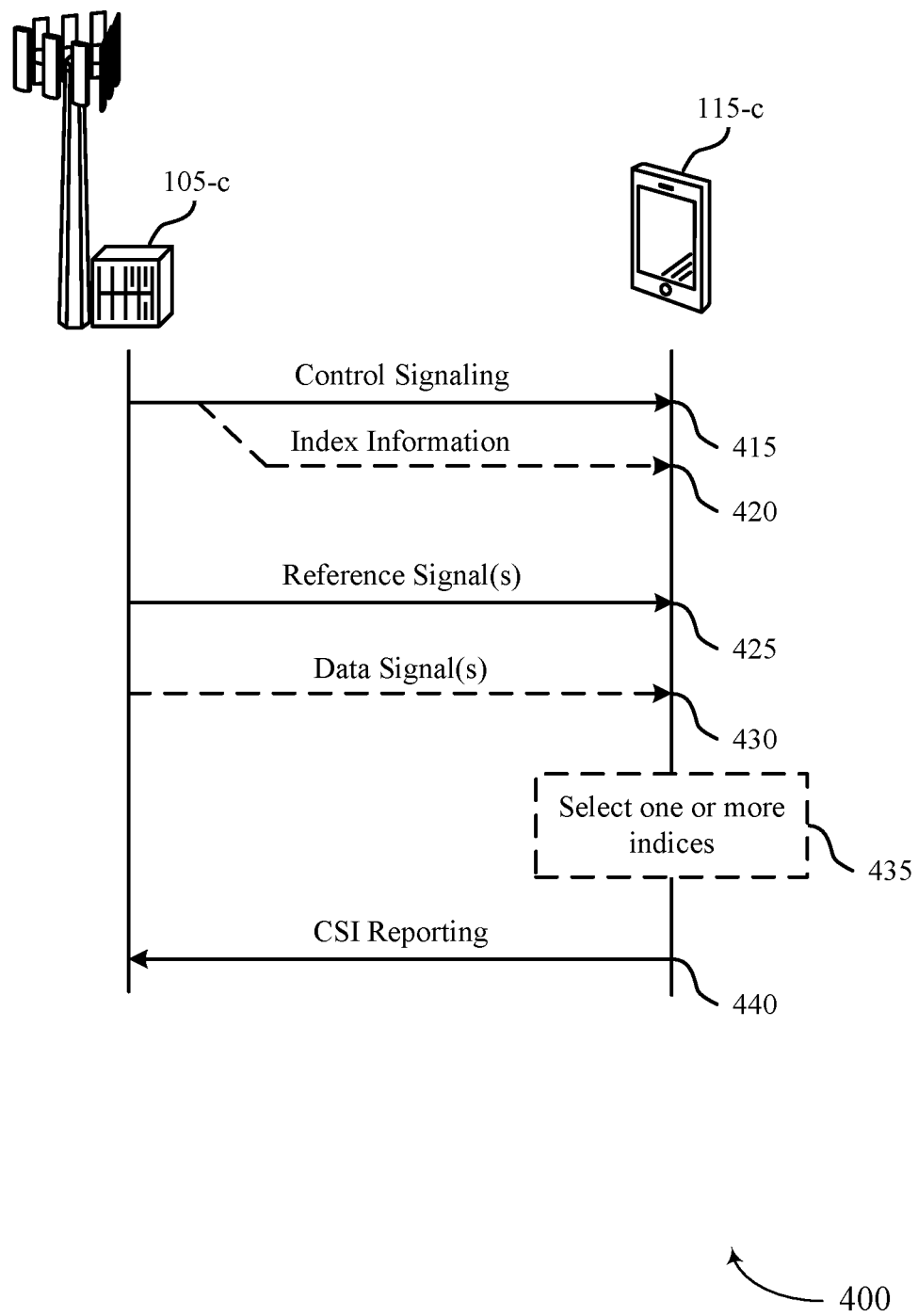
FIG. 4 illustrates an example of a process flow that supports multiple data channel-based channel state information reports in accordance with aspects of the present disclosure.

FIG. 4 illustrates an example of a process flow 400 that supports multiple data channel-based channel state information reports in accordance with aspects of the present disclosure.

The process flow 400 may implement various aspects of the present disclosure described with reference to FIGS. 1-2. The process flow 400 may include a base station 105-c, and a UE 115-c, which may be examples of base station 105 and UE 115 as described with reference to FIGS. 1-2. In some examples, the UE 115-c may be configured with procedures, instructions, or other information for CSI reporting for multiple operation scenarios.

In the following description of the process flow 400, the operations between the base station 105-c and the UE 115-c may be performed in different orders or at different times. Some operations may also be left out of the process flow 400, or other operations may be added. Although the base station 105-c and the UE 115-c are shown performing the operations of the process flow 400, some aspects of some operations may also be performed by the base station 105-c, the UE 115-c, one or more other wireless devices, or any combination thereof.

At 415, the UE 115-c may the UE 115-c may receive, from a base station, control signaling that may identify a configuration for CSI reporting associated with both a first target BLER and a second target BLER. For example, the UE 115-c may receive control signaling as described in relation to FIG. 3.

At 420, the UE 115-c may receive index information associated with a table or list of parameters for CSI reporting. In some examples, the UE 115-c may receive control signaling identifying a set of indices and a set of target BLERs. Each index of the set of indices may indicate one or more of a plurality of target BLERs of the set of target BLERs. Receiving the control signaling indicating the configuration for the CSI reporting may include receiving control signaling that may identify an index of the set of indices, and the index may correspond to the first target BLER and the second target BLER of the set of target BLERs.

In some examples, the UE 115-c may utilize a table or other organization of information that may be associated with one or more indices and various parameters for CSI reporting. For example, the UE 115-c may utilize a table such as Table 1 included herein, in which each index may correspond to one or more candidate BLERs, and the index indicated by the base station 105-c to the UE 115-c may thereby indicate one or more BLERs that the UE 115-c is to use in connection with the CSI reporting. The particular arrangement in Table 1 is one example of many possible table arrangements contemplated by the present disclosure.

TABLE 1

| Index | Associated Information |
| --- | --- |
| 000 | First Candidate BLER |
| 001 | Second Candidate BLER |
| 010 | Third Candidate BLER |
| 011 | Fourth Candidate BLER |

TABLE 1-continued

| Index | Associated Information |
| --- | --- |
| 100 | Fifth Candidate BLER |
| 101 | Sixth Candidate BLER |
| 110 | Seventh Candidate BLER |
| 111 | Eighth Candidate BLER |

Additionally or alternatively, the UE 115-c may receive control signaling identifying a set of indices, and each index of the set of indices may correspond to a combination of an ACK or NACK, a first quantization level associated with the first target BLER, and a second quantization level associated with the second target BLER. Table 2 shows one example of many possible table arrangements contemplated by the present disclosure for CSI reporting. For example, the UE 115-c may receive (e.g., via control signaling such as RRC or MAC-CE signaling) the information present in Table 2 (e.g., the indices and the various combinations of the ACK or NACK, the first quantization level, and the second quantization level. In some such examples, if a differential value for the CSI indication is less than or equal to a threshold, then the UE 115-c may use the first quantization level (e.g., quantization level 1). In some examples, if the differential value for the CSI indication is greater than a threshold, then the UE 115-c may use the second quantization level (e.g., quantization level 2). In some examples, the value of the threshold used to determine or select a quantization level may be received via control signaling (e.g., RRC or MAC-CE signaling).

TABLE 2

| Index | Associated Information |
| --- | --- |
| 000 | NACK + quantization level 1 for BLER 1 and quantization level 1 for BLER 2 |
| 001 | NACK + quantization level 1 for BLER 1 and quantization level 2 for BLER 2 |
| 010 | NACK + quantization level 2 for BLER 1 and quantization level 1 for BLER 2 |
| 011 | NACK + quantization level 2 for BLER 1 and quantization level 2 for BLER 2 |
| 100 | ACK + quantization level 1 for BLER 1 and quantization level 1 for BLER 2 |
| 101 | ACK + quantization level 1 for BLER 1 and quantization level 2 for BLER 2 |
| 110 | ACK + quantization level 2 for BLER 1 and quantization level 1 for BLER 2 |
| 111 | ACK + quantization level 2 for BLER 1 and quantization level 2 for BLER 2 |

Additionally or alternatively, the UE 115-c may receive control signaling identifying a set of indices including a first subset of indices and second subset of indices. Each index of the first subset of indices may correspond to a combination of a ACK and a first quantization level associated with the first target BLER, and each index of the second subset of indices may correspond to a combination of a negative acknowledgement and a second quantization level associated with the second target BLER.

For example, the UE 115-c may receive control signaling indicating the information shown in Table 3 herein. In Table 3, one or more target BLERs may be determine based on a decoding outcome. For example, if the decoding is successful (e.g., ACK), the UE 115-c may compute and report a CSI indication for a target BLER (e.g., BLER x). If the decoding is not successful (e.g., NACK), the UE 115-*c* may compute and report a CSI indication for a different target BLER (e.g., BLER y). In some examples, the options for the BLERs (e.g., BLER x and BLER y) may be configured (e.g., by the base station 105-*c*) through control signaling (e.g., RRC or MAC-CE).

TABLE 3

| Index | Associated Information |
|---|---|
| 000 | ACK + quantization level 1 for BLER x |
| 001 | ACK + quantization level 2 for BLER x |
| 010 | ACK + quantization level 3 for BLER x |
| 011 | ACK + quantization level 4 for BLER x |
| 100 | NACK + quantization level 1 for BLER y |
| 101 | NACK + quantization level 2 for BLER y |
| 110 | NACK + quantization level 3 for BLER y |
| 111 | NACK + quantization level 4 for BLER y |

At 425, the UE 115-*c* may receive one or more reference signals associated with the CSI reporting. In some examples, the reference signal may be a CSI reference signal or a DMRS. Such reference signals may include CSI-RS, DMRS, or other reference signals. For example, the UE 115-*c* may receive the reference signals as described in relation to FIG. 3.

At 430, the UE 115-*c* may receive a data signal from the base station 105-*c*. In some examples, the received data signal may be associated with one of the ACK or the negative acknowledgement.

At 435, the UE 115-*c* may select one or more indices associated with the CSI reporting scheme. In some examples, the UE 115-*c* may select, based at least in part on the received reference signals and the received data signal, an index of the set of indices corresponding to the first quantization level, the first quantization level corresponding to the first CSI based at least in part on the received reference signals, the second quantization level corresponding to the second CSI based at least in part on the received reference signals, and one of a ACK or NACK associated with the received data signal. The first CSI and the second CSI may include or be associated with the selected index. For example, the UE 115-*c* may select one or more indices as shown in Table 2 to select an ACK or NACK and one or more quantization levels for the various BLERs. For example, if the UE 115-*c* receives the data signal successfully, the UE 115-*c* may determine or select an ACK. Further, the UE 115-*c* may further determine or select the quantization levels to be used for each of the BLER requirements. Based at least in part on the ACK and the quantization levels, the UE 115-*c* may then select an index (e.g., an index shown in Table 2).

Additionally or alternatively, the UE 115-*c* may select, based at least in part on the received reference signals and the one of the ACK or the negative acknowledgement, an index of the set of indices corresponding to the ACK and the first quantization level corresponding to the first CSI based at least in part on the received reference signals or corresponding to the negative acknowledgement and the second quantization level corresponding to the second CSI based at least in part on the received reference signals. One of the first CSI or the second CSI may include or be associated with the selected index. For example, as shown in Table 3, the UE 115-*c* may select an index, and a target BLER may be selected or determined based on a decoding outcome (e.g., as represented in Table 3 by ACK or NACK). For example, if the UE 115-*c* successfully decodes the data signal, the UE 115-*c* may then select a first BLER (e.g., BLER x), and if the UE 115-*c* unsuccessfully decodes the data signal, the UE 115-*c* may then select a second BLER (e.g., BLER y). Further, the UE 115-*c* may determine or select one or more quantization levels associated with the CSI reporting (e.g., with the CSI indications, such as the MCS or the CQI). Based on the ACK or NACK and the quantization level (and possibly other factors or elements), the UE 115-*c* may select an index (e.g., an index of Table 3).

At 440, the UE 115-*c* may transmit, to the base station, the CSI reporting that may include first CSI for the first target BLER and second CSI for the second target BLER, and each of the first CSI and the second CSI may be based on the received reference signals. For example, the UE 115-*c* may transmit the CSI reporting as described in relation to FIG. 3. In some examples, the UE 115-*c* may transmit the CSI reporting based on the selected one or more indices that may be associated with an ACK or NACK, one or more quantization levels, one or more BLERs, one or more CSI indications, or any combination thereof.

Figure 5:
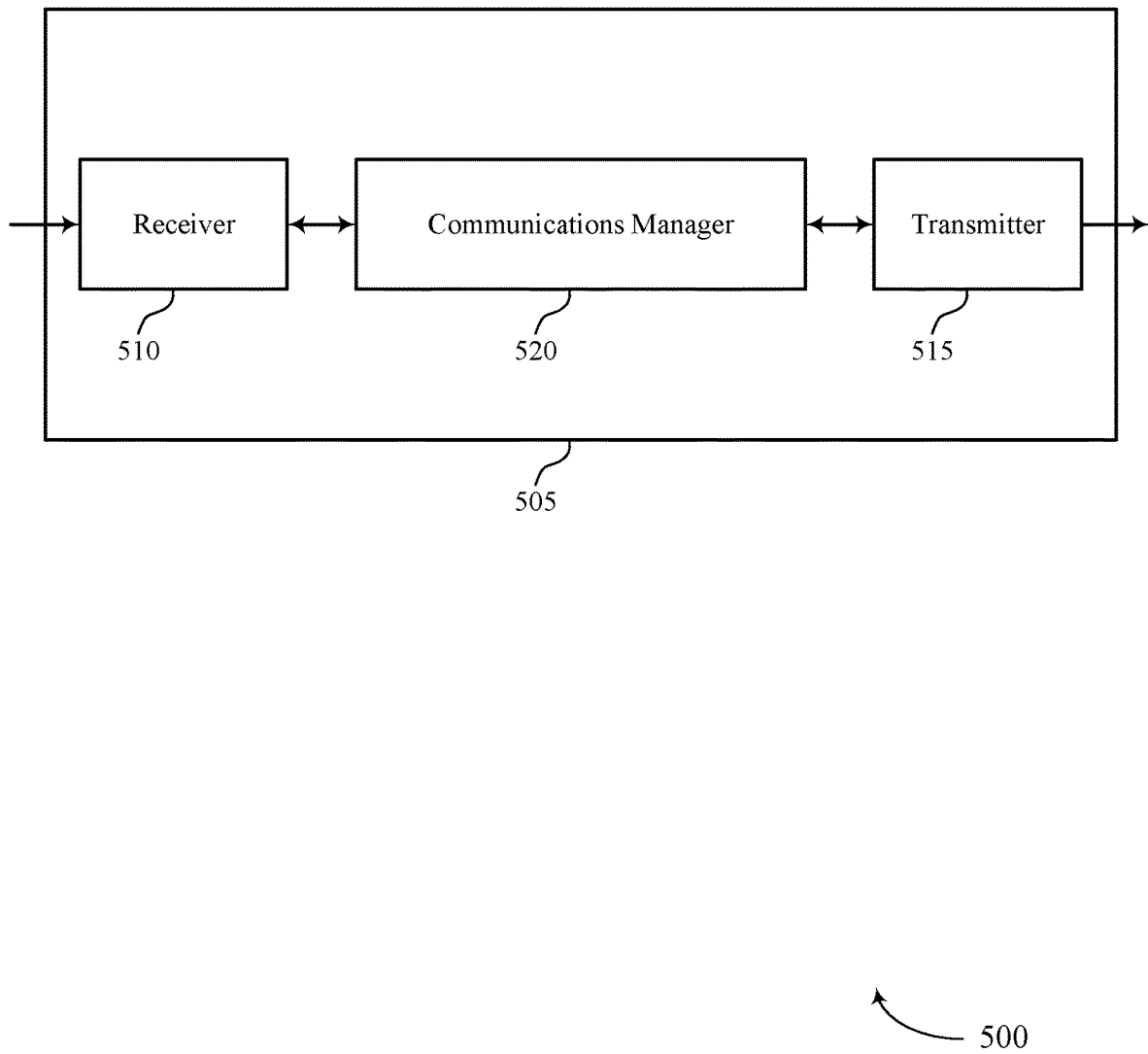
FIGS. 5 and 6 show block diagrams of devices that support multiple data channel-based channel state information reports in accordance with aspects of the present disclosure.

FIG. 5 shows a block diagram 500 of a device 505 that supports multiple data channel-based channel state information reports in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the CSI reporting features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to multiple PDSCH-based CSI reports for both URLLC and eMBB). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiple PDSCH-based CSI reports for both URLLC and eMBB). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multiple PDSCH-based CSI reports for both URLLC and eMBB as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, control signaling identifying a configuration for channel state information reporting associated with both a first target block error rate and a second target block error rate. The communications manager 520 may be configured as or otherwise support a means for receiving reference signals associated with the channel state information reporting. The communications manager 520 may be configured as or otherwise support a means for transmitting, to the base station, the channel state information reporting that includes first channel state information for the first target block error rate and second channel state information for the second target block error rate, each of the first channel state information and the second channel state information based on the received reference signals.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources, or a combination thereof.

Figure 6:
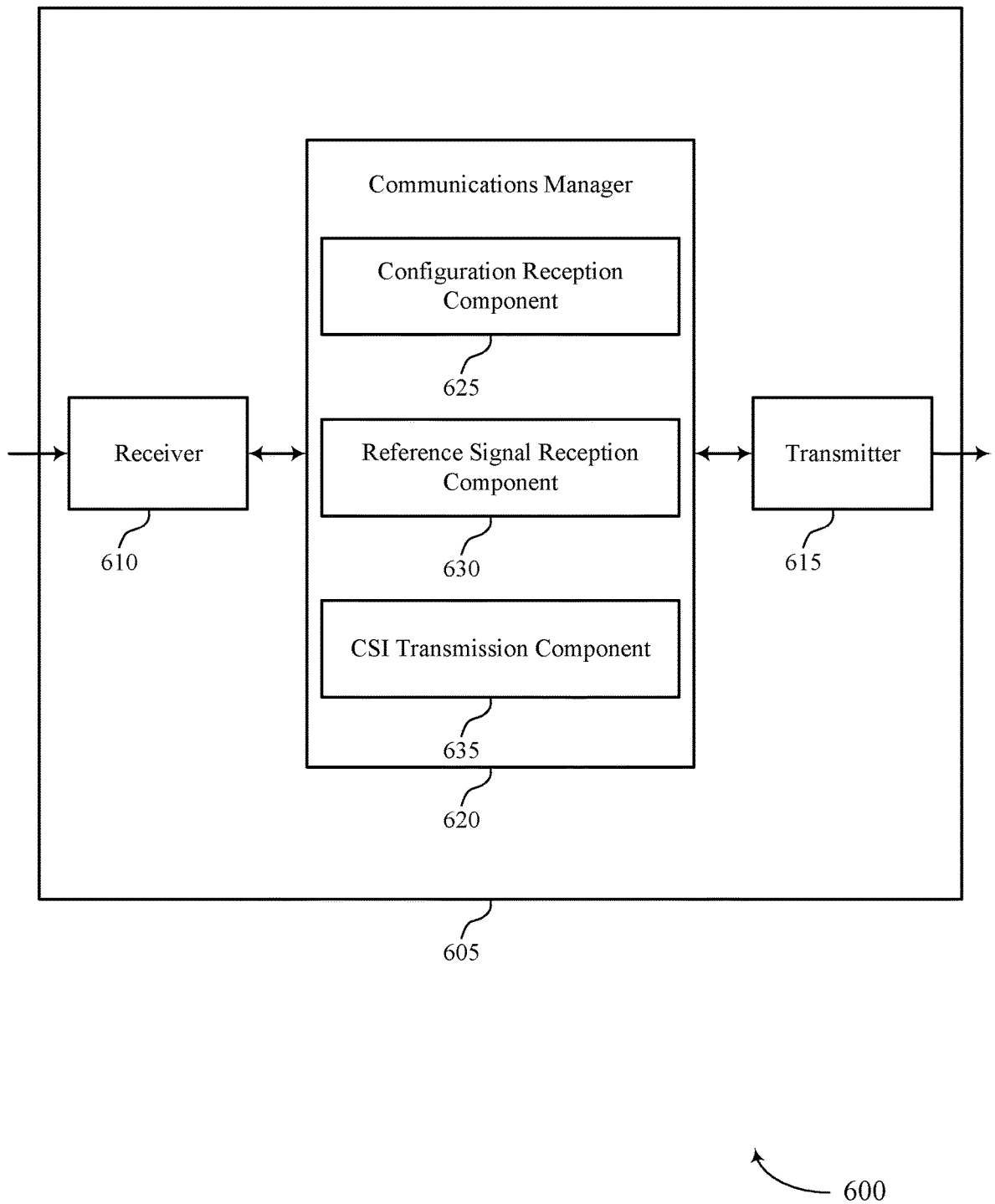

FIG. 6 shows a block diagram 600 of a device 605 that supports multiple data channel-based channel state information reports in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiple PDSCH-based CSI reports for both URLLC and eMBB). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiple PDSCH-based CSI reports for both URLLC and eMBB). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multiple PDSCH-based CSI reports for both URLLC and eMBB as described herein. For example, the communications manager 620 may include a configuration reception component 625, a reference signal reception component 630, a CSI transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The configuration reception component 625 may be configured as or otherwise support a means for receiving, from a base station, control signaling identifying a configuration for channel state information reporting associated with both a first target block error rate and a second target block error rate. The reference signal reception component 630 may be configured as or otherwise support a means for receiving reference signals associated with the channel state information reporting. The CSI transmission component 635 may be configured as or otherwise support a means for transmitting, to the base station, the channel state information reporting that includes first channel state information for the first target block error rate and second channel state information for the second target block error rate, each of the first channel state information and the second channel state information based on the received reference signals.

In some cases, the configuration reception component 625, the reference signal reception component 630, and the CSI transmission component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of configuration reception component 625, the reference signal reception component 630, and the CSI transmission component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
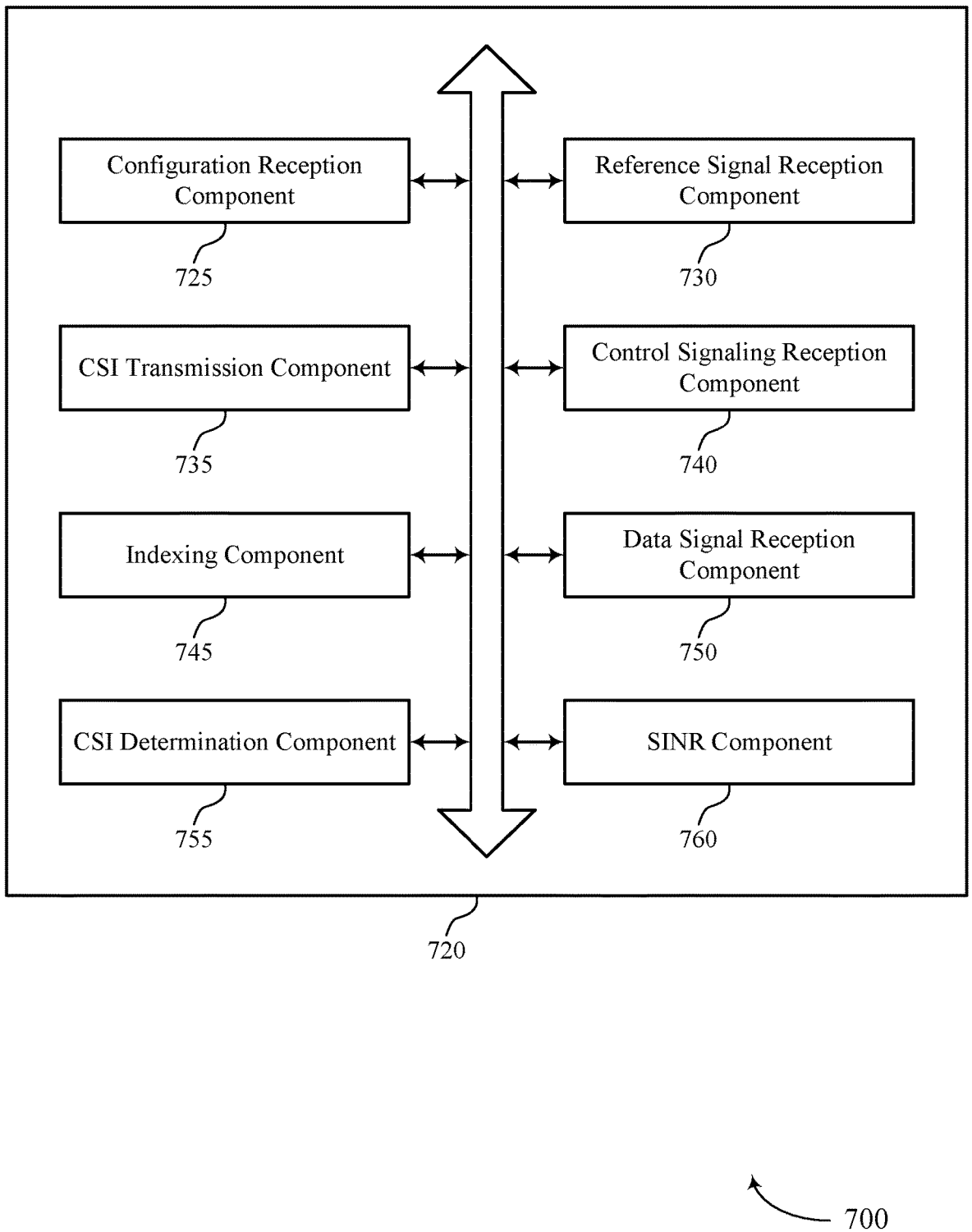
FIG. 7 shows a block diagram of a communications manager that supports multiple data channel-based channel state information reports in accordance with aspects of the present disclosure.

FIG. 7 shows a block diagram 700 of a communications manager 720 that supports multiple data channel-based channel state information reports in accordance with aspects of the present disclosure. The communications manager 720 may be an example of aspects of a communications manager 520, a communications manager 620, or both, as described herein. The communications manager 720, or various components thereof, may be an example of means for performing various aspects of multiple PDSCH-based CSI reports for both URLLC and eMBB as described herein. For example, the communications manager 720 may include a configuration reception component 725, a reference signal reception component 730, a CSI transmission component 735, a control signaling reception component 740, an indexing component 745, a data signal reception component 750, a CSI determination component 755, an SINR component 760, or any combination thereof. Each of these components may communicate, directly or indirectly, with one another (e.g., via one or more buses).

The communications manager 720 may support wireless communications at a UE in accordance with examples as disclosed herein. The configuration reception component 725 may be configured as or otherwise support a means for receiving, from a base station, control signaling identifying a configuration for channel state information reporting associated with both a first target block error rate and a second target block error rate. The reference signal reception component 730 may be configured as or otherwise support a means for receiving reference signals associated with the channel state information reporting. The CSI transmission component 735 may be configured as or otherwise support a means for transmitting, to the base station, the channel state information reporting that includes first channel state information for the first target block error rate and second channel state information for the second target block error rate, each of the first channel state information and the second channel state information based on the received reference signals.

In some examples, to support receiving the control signaling indicating the configuration, the control signaling reception component 740 may be configured as or otherwise support a means for receiving control signaling identifying a first set of thresholds for the first target block error rate for the channel state information reporting and a second set of thresholds for the second target block error rate for the channel state information reporting.

In some examples, the control signaling reception component 740 may be configured as or otherwise support a means for receiving control signaling identifying the first target block error rate and the second target block error rate.

In some examples, the indexing component 745 may be configured as or otherwise support a means for receiving control signaling identifying a set of indices and a set of target block error rates, each index of the set of indices indicating one or more a set of multiple target block error rates of the set of target block error rates. In some examples, to receive the control signaling indicating the configuration for the channel state information reporting, the indexing component 745 may be configured as or otherwise support a means for receiving control signaling identifying an index of the set of indices, the index corresponding to the first target block error rate and the second target block error rate of the set of target block error rates.

In some examples, the indexing component 745 may be configured as or otherwise support a means for receiving control signaling identifying a set of indices, each index of the set of indices corresponding to a combination of a positive or negative acknowledgment, a first quantization level associated with the first target block error rate, and a second quantization level associated with the second target block error rate. In some examples, the data signal reception component 750 may be configured as or otherwise support a means for receiving a data signal from the base station. In some examples, the indexing component 745 may be configured as or otherwise support a means for selecting, based on the received reference signals and the received data signal, an index of the set of indices corresponding to the first quantization level, the first quantization level corresponding to the first channel state information based on the received reference signals, the second quantization level corresponding to the second channel state information based on the received reference signals, and one of a positive or negative acknowledgment associated with the received data signal, where the first channel state information and the second channel state information include the selected index.

In some examples, the indexing component 745 may be configured as or otherwise support a means for receiving control signaling identifying a set of indices including a first subset of indices and second subset of indices, where first each index of the subset of indices corresponds to a combination of a positive acknowledgement and a first quantization level associated with the first target block error rate, and each index of the second subset of indices corresponds to a combination of a negative acknowledgement and a second quantization level associated with the second target block error rate. In some examples, the data signal reception component 750 may be configured as or otherwise support a means for receiving a data signal from the base station, the received data signal associated with one of the positive acknowledgement or the negative acknowledgement. In some examples, the indexing component 745 may be configured as or otherwise support a means for selecting, based on the received reference signals and the one of the positive acknowledgement or the negative acknowledgement, an index of the set of indices corresponding to the positive acknowledgement and the first quantization level corresponding to the first channel state information based on the received reference signals or corresponding to the negative acknowledgement and the second quantization level corresponding to the second channel state information based on the received reference signals, where one of the first channel state information or the second channel state information includes the selected index.

In some examples, the CSI determination component 755 may be configured as or otherwise support a means for selecting a first quantization level as the first channel state information based on the first target block error rate and one or more block error rate thresholds. In some examples, the CSI determination component 755 may be configured as or otherwise support a means for selecting a second quantization level as the second channel state information based on the second target block error rate and the one or more block error rate thresholds.

In some examples, the SINR component 760 may be configured as or otherwise support a means for determining a signal to interference and noise ratio associated with the reference signal. In some examples, the SINR component 760 may be configured as or otherwise support a means for mapping the signal to interference and noise ratio to one or more of a set of multiple channel state information curves. In some examples, the CSI determination component 755 may be configured as or otherwise support a means for selecting an indication of the first channel state information and an indication of the second channel state information based on the mapping.

In some examples, the control signaling reception component 740 may be configured as or otherwise support a means for receiving a request for the first channel state information and the second channel state information, the request received in a radio resource control message, a medium access control control element message, or a downlink control information message. In some examples, the reference signal is a channel state information reference signal or a demodulation reference signal.

In some cases, the configuration reception component 725, the reference signal reception component 730, the CSI transmission component 735, the control signaling reception component 740, the indexing component 745, the data signal reception component 750, the CSI determination component 755, and the SINR component 760 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration reception component 725, the reference signal reception component 730, the CSI transmission component 735, the control signaling reception component 740, the indexing component 745, the data signal reception component 750, the CSI determination component 755, and the SINR component 760 discussed herein.

Figure 8:
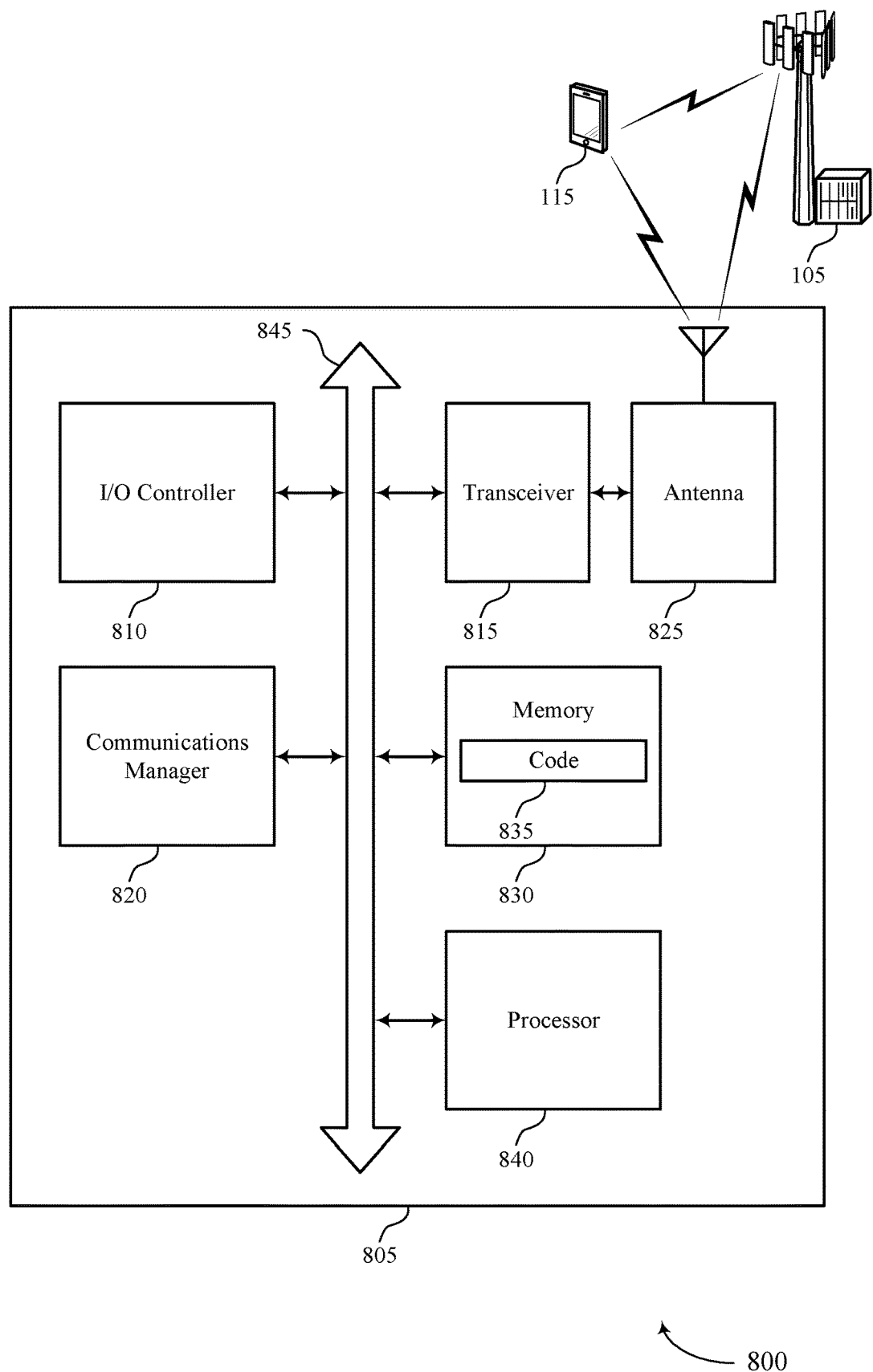
FIG. 8 shows a diagram of a system including a device that supports multiple data channel-based channel state information reports in accordance with aspects of the present disclosure.

FIG. 8 shows a diagram of a system 800 including a device 805 that supports multiple data channel-based channel state information reports in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiple PDSCH-based CSI reports for both URLLC and eMBB). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, control signaling identifying a configuration for channel state information reporting associated with both a first target block error rate and a second target block error rate. The communications manager 820 may be configured as or otherwise support a means for receiving reference signals associated with the channel state information reporting. The communications manager 820 may be configured as or otherwise support a means for transmitting, to the base station, the channel state information reporting that includes first channel state information for the first target block error rate and second channel state information for the second target block error rate, each of the first channel state information and the second channel state information based on the received reference signals.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiple PDSCH-based CSI reports for both URLLC and eMBB as described herein, or the processor 840 and the memory 830 may be otherwise configured to perform or support such operations.

Figure 9:
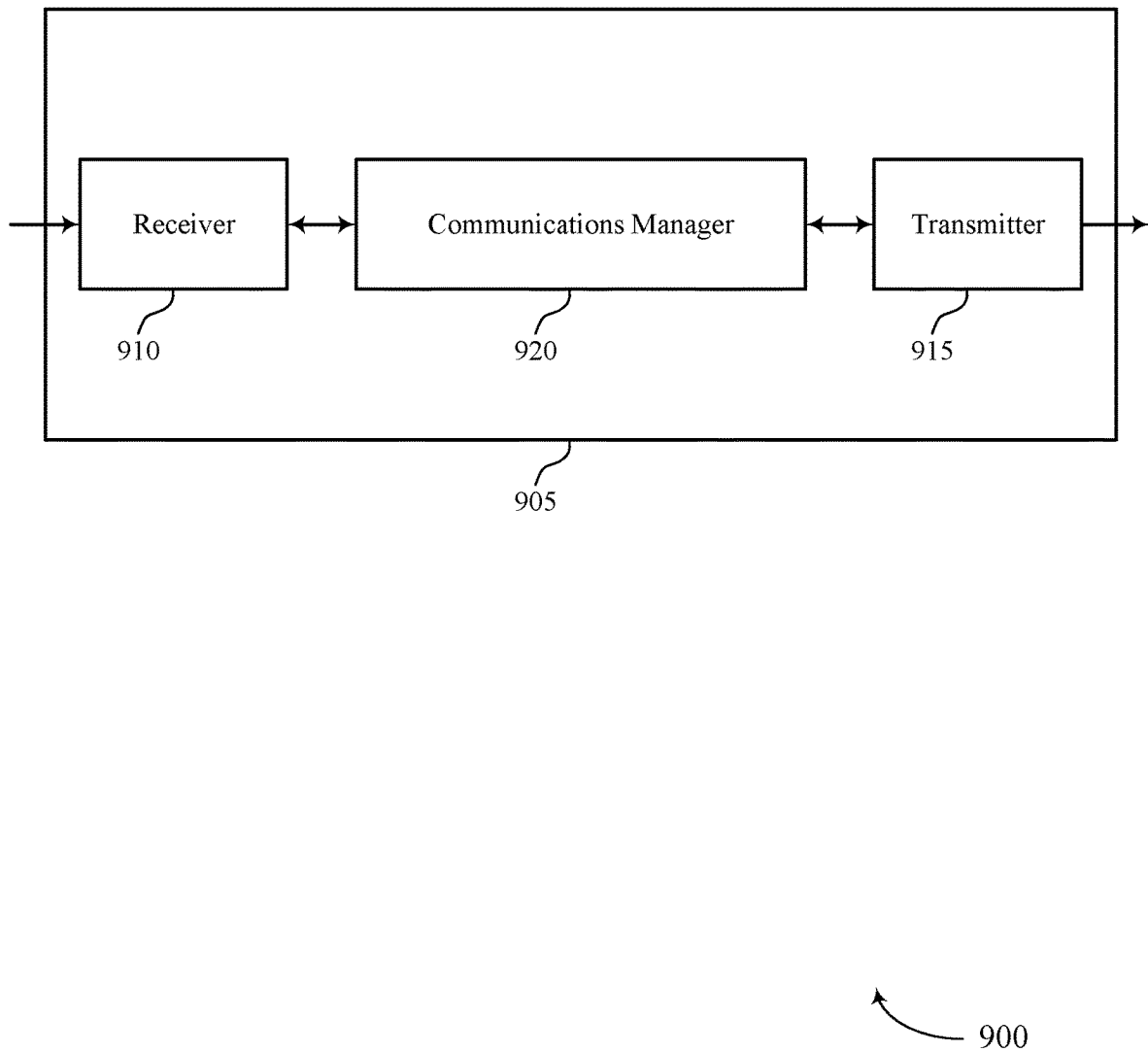
FIGS. 9 and 10 show block diagrams of devices that support multiple data channel-based channel state information reports in accordance with aspects of the present disclosure.

FIG. 9 shows a block diagram 900 of a device 905 that supports multiple data channel-based channel state information reports in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the CSI reporting features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to multiple PDSCH-based CSI reports for both URLLC and eMBB). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiple PDSCH-based CSI reports for both URLLC and eMBB). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of multiple PDSCH-based CSI reports for both URLLC and eMBB as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, control signaling identifying a configuration for channel state information reporting associated with both a first target block error rate and a second target block error rate. The communications manager 920 may be configured as or otherwise support a means for transmitting reference signals associated with the channel state information reporting. The communications manager 920 may be configured as or otherwise support a means for receiving, from the UE, the channel state information reporting that includes first channel state information for the first target block error rate and second channel state information for the second target block error rate, each of the first channel state information and the second channel state information based on the reference signals.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources, or a combination thereof.

Figure 10:
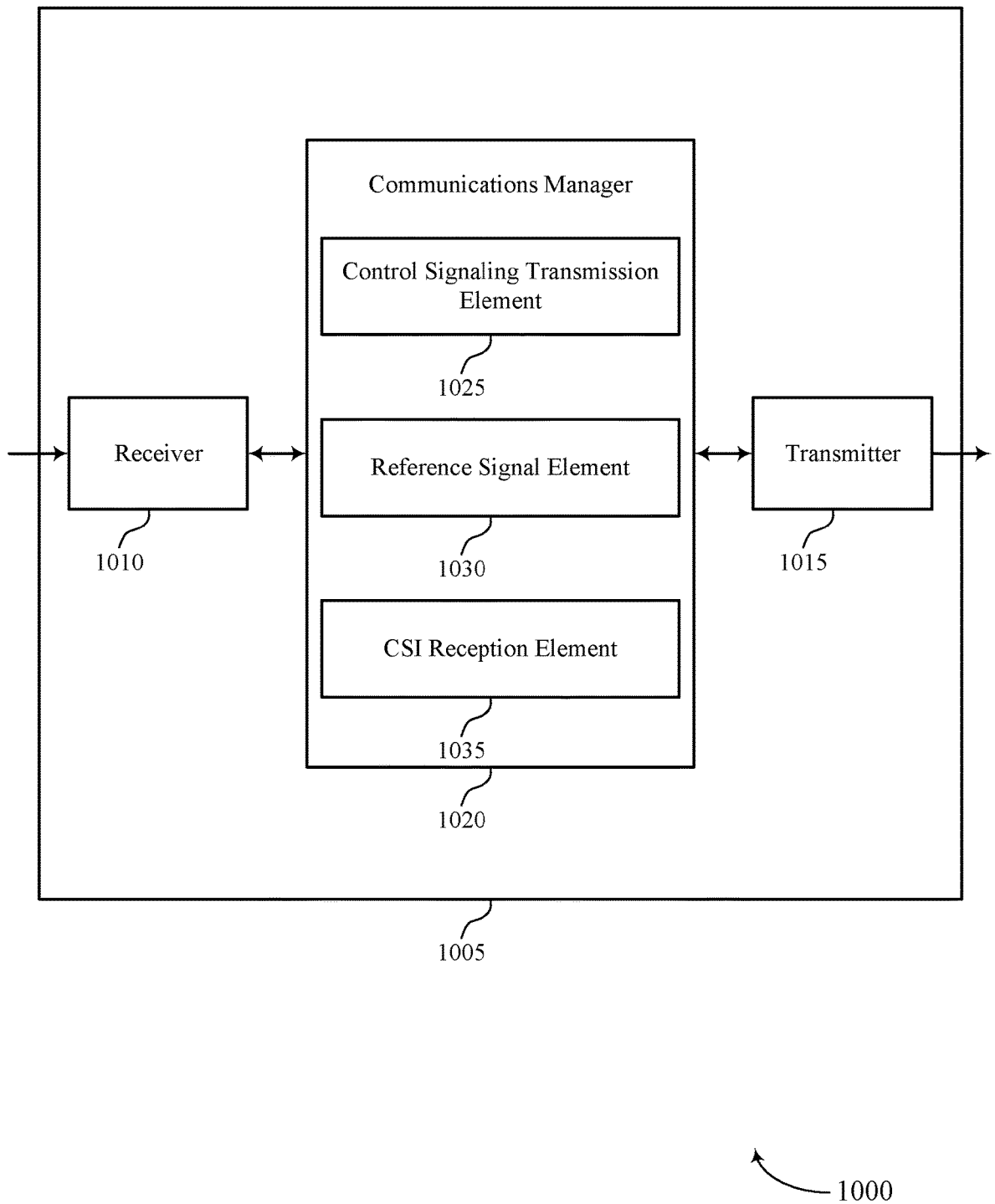

FIG. 10 shows a block diagram 1000 of a device 1005 that supports multiple data channel-based channel state information reports in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiple PDSCH-based CSI reports for both URLLC and eMBB). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiple PDSCH-based CSI reports for both URLLC and eMBB). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of multiple PDSCH-based CSI reports for both URLLC and eMBB as described herein. For example, the communications manager 1020 may include a control signaling transmission element 1025, a reference signal element 1030, a CSI reception element 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control signaling transmission element 1025 may be configured as or otherwise support a means for transmitting, to a UE, control signaling identifying a configuration for channel state information reporting associated with both a first target block error rate and a second target block error rate. The reference signal element 1030 may be configured as or otherwise support a means for transmitting reference signals associated with the channel state information reporting. The CSI reception element 1035 may be configured as or otherwise support a means for receiving, from the UE, the channel state information reporting that includes first channel state information for the first target block error rate and second channel state information for the second target block error rate, each of the first channel state information and the second channel state information based on the reference signals.

In some cases, the control signaling transmission element 1025, the reference signal element 1030, and the CSI reception element 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of control signaling transmission element 1025, the reference signal element 1030, and the CSI reception element 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
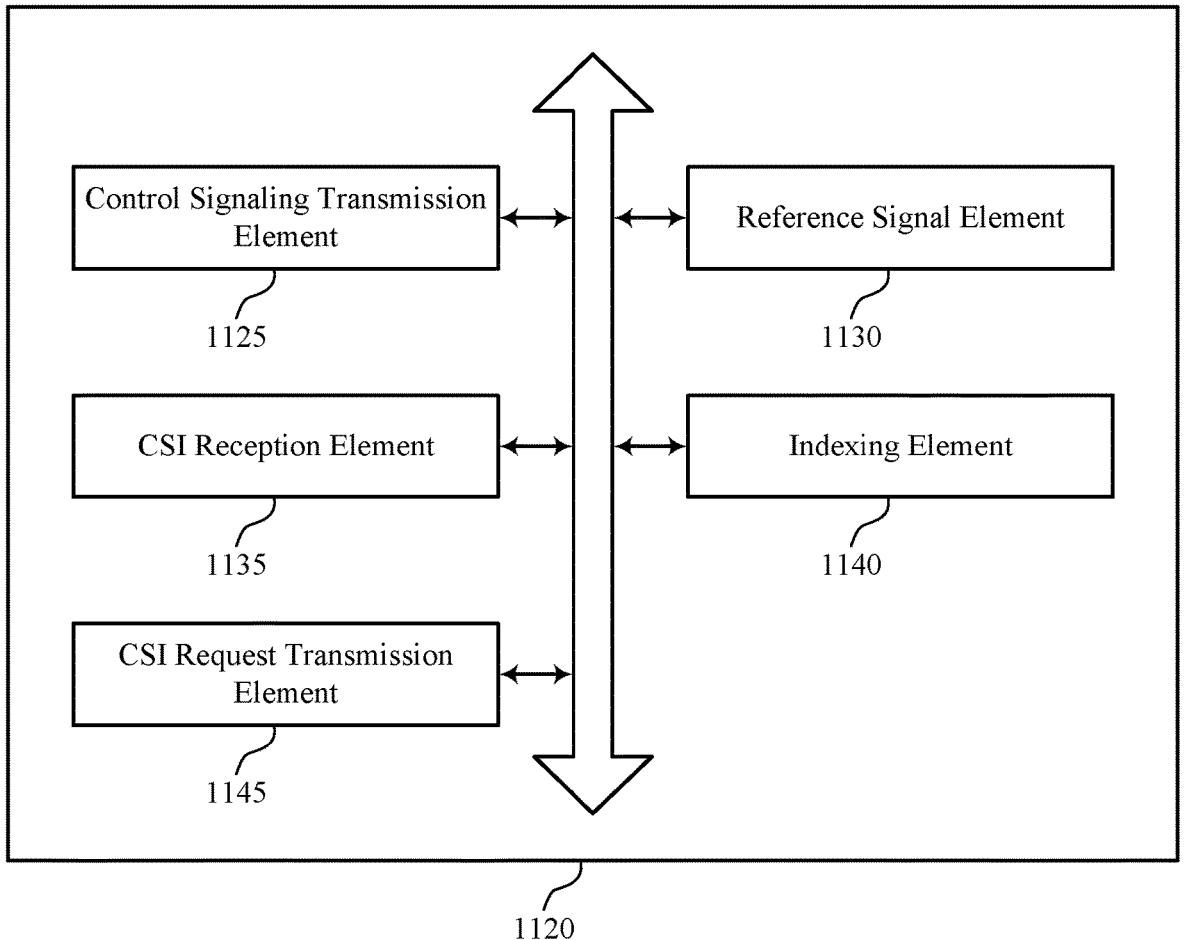
FIG. 11 shows a block diagram of a communications manager that supports multiple data channel-based channel state information reports in accordance with aspects of the present disclosure.

FIG. 11 shows a block diagram 1100 of a communications manager 1120 that supports multiple data channel-based channel state information reports in accordance with aspects of the present disclosure. The communications manager 1120 may be an example of aspects of a communications manager 920, a communications manager 1020, or both, as described herein. The communications manager 1120, or various components thereof, may be an example of means for performing various aspects of multiple PDSCH-based CSI reports for both URLLC and eMBB as described herein. For example, the communications manager 1120 may include a control signaling transmission element 1125, a reference signal element 1130, a CSI reception element 1135, an indexing element 1140, a CSI request transmission element 1145, or any combination thereof. Each of these components may communicate, directly or indirectly, with one another (e.g., via one or more buses).

The communications manager 1120 may support wireless communications at a base station in accordance with examples as disclosed herein. The control signaling transmission element 1125 may be configured as or otherwise support a means for transmitting, to a UE, control signaling identifying a configuration for channel state information reporting associated with both a first target block error rate and a second target block error rate. The reference signal element 1130 may be configured as or otherwise support a means for transmitting reference signals associated with the channel state information reporting. The CSI reception element 1135 may be configured as or otherwise support a means for receiving, from the UE, the channel state information reporting that includes first channel state information for the first target block error rate and second channel state information for the second target block error rate, each of the first channel state information and the second channel state information based on the reference signals.

In some examples, to support transmitting the control signaling indicating the configuration, the control signaling transmission element 1125 may be configured as or otherwise support a means for transmitting, the UE, control signaling identifying a first set of thresholds for the first target block error rate for the channel state information reporting and a second set of thresholds for the second target block error rate for the channel state information reporting.

In some examples, the control signaling transmission element 1125 may be configured as or otherwise support a means for transmitting control signaling identifying the first target block error rate and the second target block error rate.

In some examples, the control signaling transmission element 1125 may be configured as or otherwise support a means for transmitting, to the UE, control signaling identifying a set of indices and a set of target block error rates, each index of the set of indices indicating one or more a set of multiple target block error rates of the set of target block error rates. In some examples, to transmit the control signaling indicating the configuration for the channel state information reporting, the control signaling transmission element 1125 may be configured as or otherwise support a means for transmitting control signaling identifying an index of the set of indices, the index corresponding to the first target block error rate and the second target block error rate of the set of target block error rates.

In some examples, the indexing element 1140 may be configured as or otherwise support a means for transmitting, to the UE, control signaling identifying a set of indices, each index of the set of indices corresponding to a combination of a positive or negative acknowledgment, a first quantization level associated with the first target block error rate, and a second quantization level associated with the second target block error rate.

In some examples, the indexing element 1140 may be configured as or otherwise support a means for transmitting, to the UE, control signaling identifying a set of indices including a first subset of indices and second subset of indices, where first each index of the subset of indices corresponds to a combination of a positive acknowledgement and a first quantization level associated with the first target block error rate, and each index of the second subset of indices corresponds to a combination of a negative acknowledgement and a second quantization level associated with the second target block error rate.

In some examples, the CSI request transmission element 1145 may be configured as or otherwise support a means for transmitting, to the UE, a request for the first channel state information and the second channel state information, the request transmitted in a radio resource control message, a medium access control control element message, or a downlink control information message.

In some cases, the control signaling transmission element 1125, the reference signal element 1130, CSI reception element 1135, the indexing element 1140, and the CSI request transmission element 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmission element 1125, the reference signal element 1130, CSI reception element 1135, the indexing element 1140, and the CSI request transmission element 1145 discussed herein.

Figure 12:
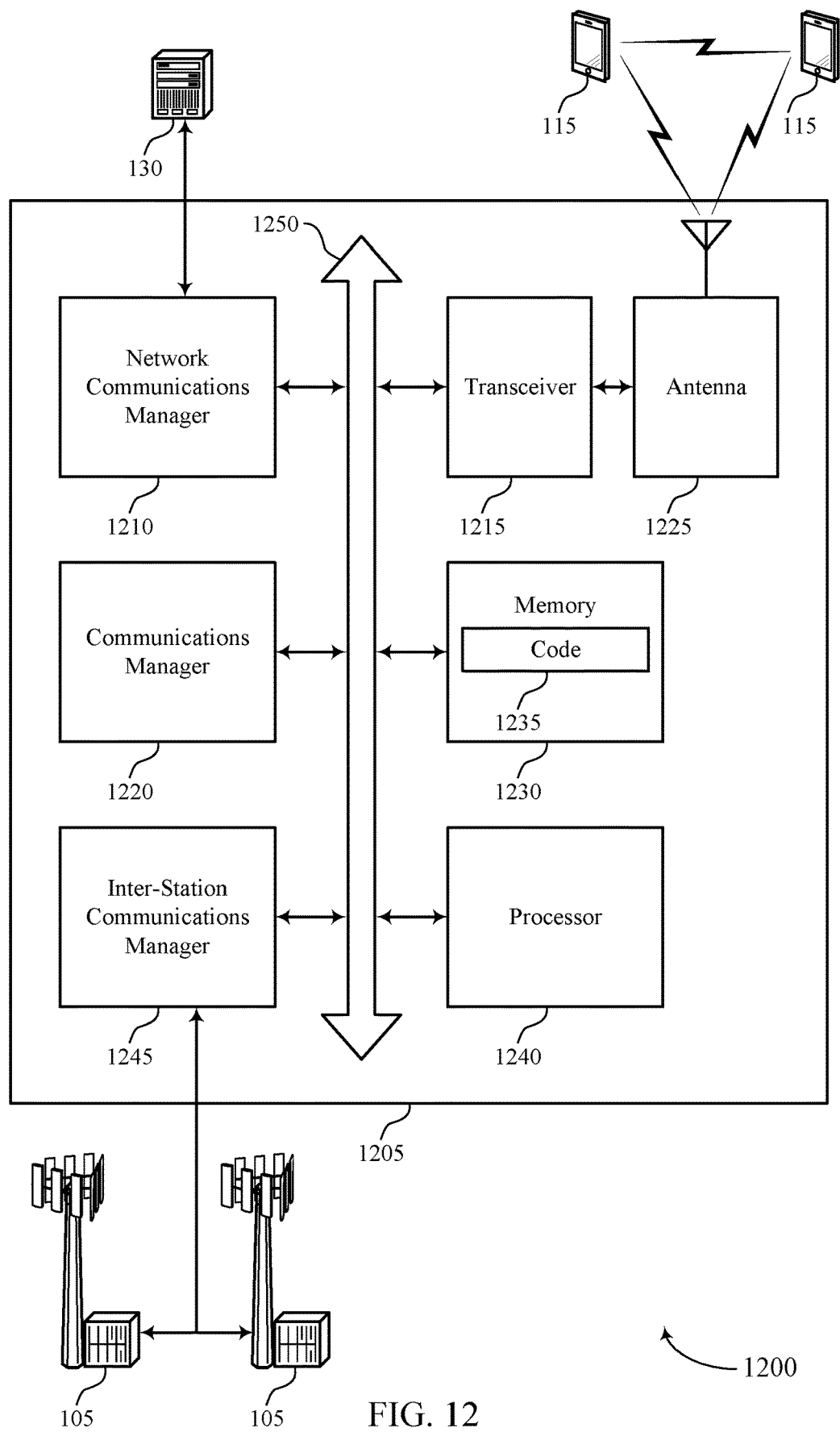
FIG. 12 shows a diagram of a system including a device that supports multiple data channel-based channel state information reports in accordance with aspects of the present disclosure.

FIG. 12 shows a diagram of a system 1200 including a device 1205 that supports multiple data channel-based channel state information reports in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiple PDSCH-based CSI reports for both URLLC and eMBB). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, control signaling identifying a configuration for channel state information reporting associated with both a first target block error rate and a second target block error rate. The communications manager 1220 may be configured as or otherwise support a means for transmitting reference signals associated with the channel state information reporting. The communications manager 1220 may be configured as or otherwise support a means for receiving, from the UE, the channel state information reporting that includes first channel state information for the first target block error rate and second channel state information for the second target block error rate, each of the first channel state information and the second channel state information based on the reference signals.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multiple PDSCH-based CSI reports for both URLLC and eMBB as described herein, or the processor 1240 and the memory 1230 may be otherwise configured to perform or support such operations.

Figure 13:
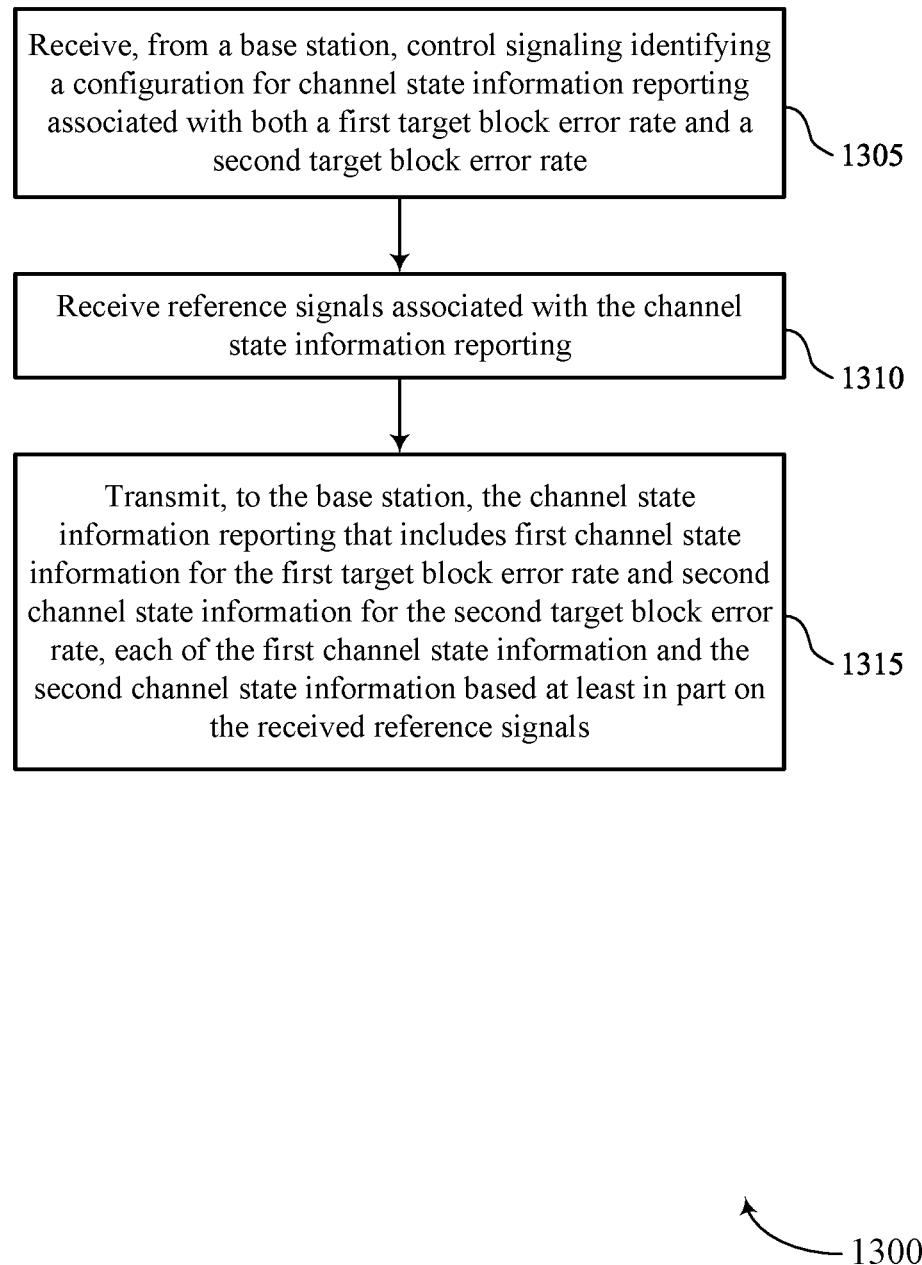
FIGS. 13 through 17 show flowcharts illustrating methods that support multiple data channel-based channel state information reports in accordance with aspects of the present disclosure.

FIG. 13 shows a flowchart illustrating a method 1300 that supports multiple data channel-based channel state information reports in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling identifying a configuration for channel state information reporting associated with both a first target block error rate and a second target block error rate. The operations of 1305 may be performed in accordance with examples as disclosed herein. In some examples, aspects of the operations of 1305 may be performed by a configuration reception component 725 as described with reference to FIG. 7.

At 1310, the method may include receiving reference signals associated with the channel state information reporting. The operations of 1310 may be performed in accordance with examples as disclosed herein. In some examples, aspects of the operations of 1310 may be performed by a reference signal reception component 730 as described with reference to FIG. 7.

At 1315, the method may include transmitting, to the base station, the channel state information reporting that includes first channel state information for the first target block error rate and second channel state information for the second target block error rate, each of the first channel state information and the second channel state information based on the received reference signals. The operations of 1315 may be performed in accordance with examples as disclosed herein. In some examples, aspects of the operations of 1315 may be performed by a CSI transmission component 735 as described with reference to FIG. 7.

Figure 14:
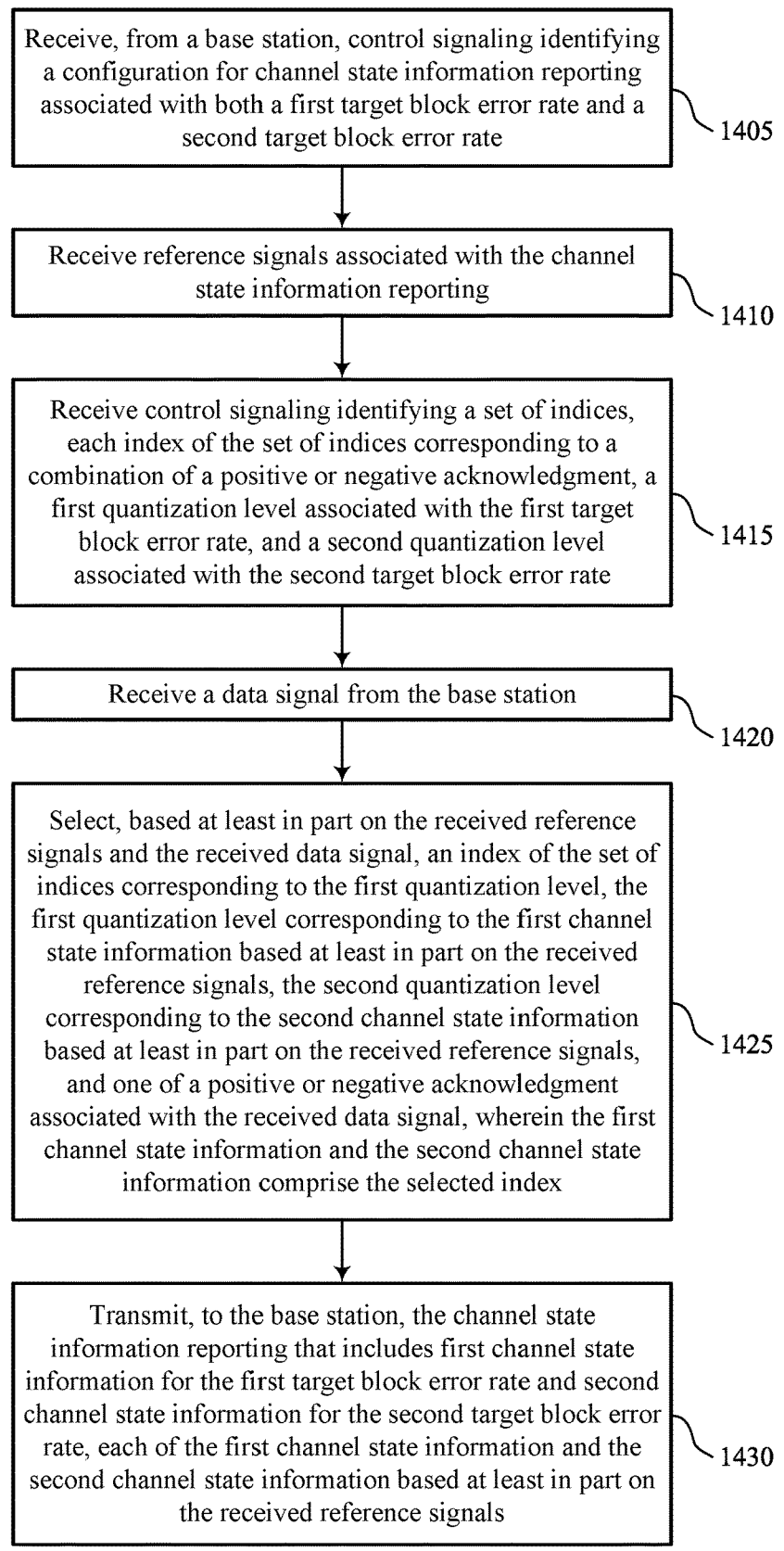

FIG. 14 shows a flowchart illustrating a method 1400 that supports multiple data channel-based channel state information reports in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a configuration for channel state information reporting associated with both a first target block error rate and a second target block error rate. The operations of 1405 may be performed in accordance with examples as disclosed herein. In some examples, aspects of the operations of 1405 may be performed by a configuration reception component 725 as described with reference to FIG. 7.

At 1410, the method may include receiving reference signals associated with the channel state information reporting. The operations of 1410 may be performed in accordance with examples as disclosed herein. In some examples, aspects of the operations of 1410 may be performed by a reference signal reception component 730 as described with reference to FIG. 7.

At 1415, the method may include receiving control signaling identifying a set of indices, each index of the set of indices corresponding to a combination of a positive or negative acknowledgment, a first quantization level associated with the first target block error rate, and a second quantization level associated with the second target block error rate. The operations of 1415 may be performed in accordance with examples as disclosed herein. In some examples, aspects of the operations of 1415 may be performed by an indexing component 745 as described with reference to FIG. 7.

At 1420, the method may include receiving a data signal from the base station. The operations of 1420 may be performed in accordance with examples as disclosed herein. In some examples, aspects of the operations of 1420 may be performed by a data signal reception component 750 as described with reference to FIG. 7.

At 1425, the method may include selecting, based on the received reference signals and the received data signal, an index of the set of indices corresponding to the first quantization level, the first quantization level corresponding to the first channel state information based on the received reference signals, the second quantization level corresponding to the second channel state information based on the received reference signals, and one of a positive or negative acknowledgment associated with the received data signal, where the first channel state information and the second channel state information include the selected index. The operations of 1425 may be performed in accordance with examples as disclosed herein. In some examples, aspects of the operations of 1425 may be performed by an indexing component 745 as described with reference to FIG. 7.

At 1430, the method may include transmitting, to the base station, the channel state information reporting that includes first channel state information for the first target block error rate and second channel state information for the second target block error rate, each of the first channel state information and the second channel state information based on the received reference signals. The operations of 1430 may be performed in accordance with examples as disclosed herein. In some examples, aspects of the operations of 1430 may be performed by a CSI transmission component 735 as described with reference to FIG. 7.

Figure 15:
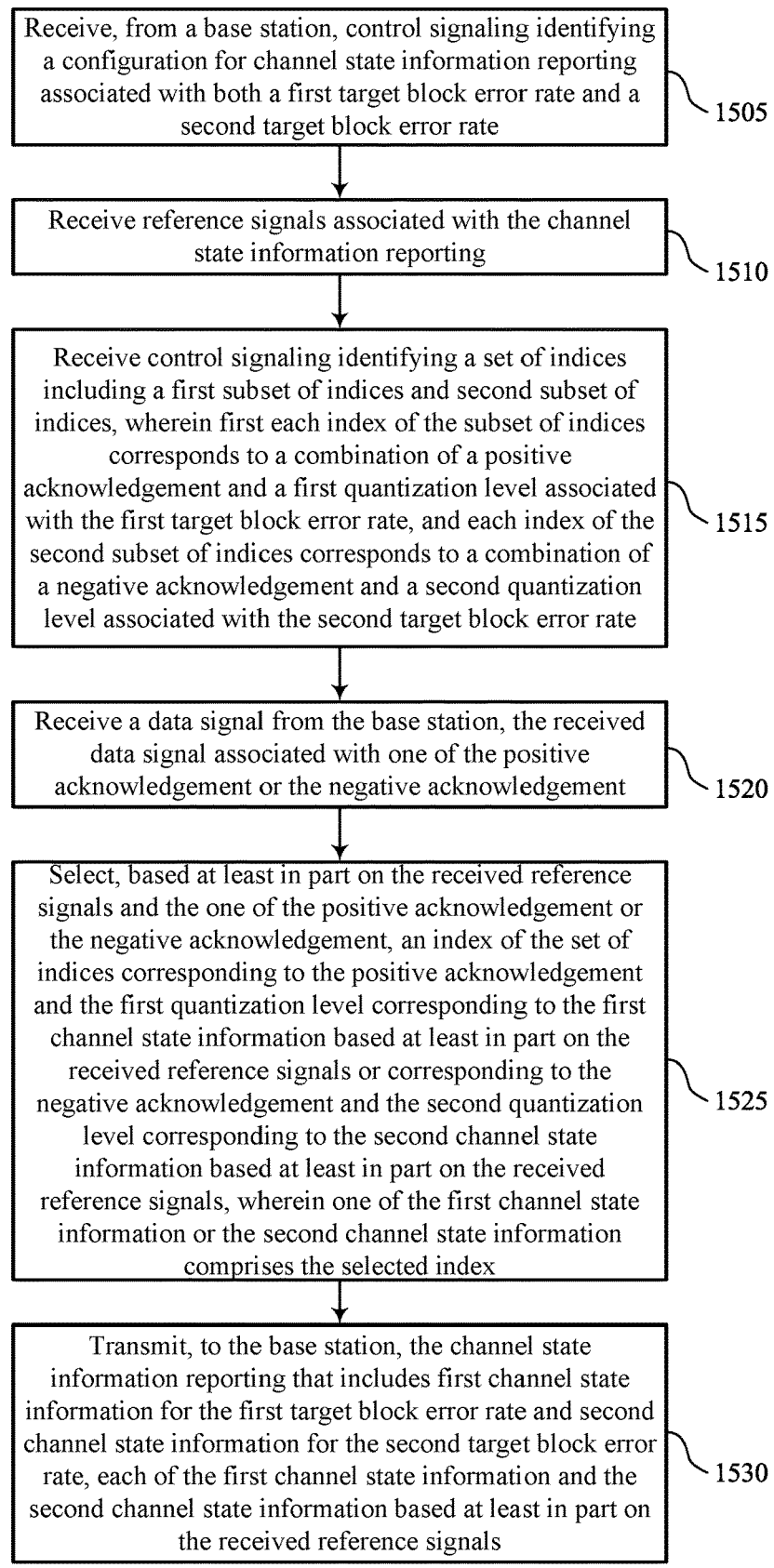

FIG. 15 shows a flowchart illustrating a method 1500 that supports multiple data channel-based channel state information reports in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling identifying a configuration for channel state information reporting associated with both a first target block error rate and a second target block error rate. The operations of 1505 may be performed in accordance with examples as disclosed herein. In some examples, aspects of the operations of 1505 may be performed by a configuration reception component 725 as described with reference to FIG. 7.

At 1510, the method may include receiving reference signals associated with the channel state information reporting. The operations of 1510 may be performed in accordance with examples as disclosed herein. In some examples, aspects of the operations of 1510 may be performed by a reference signal reception component 730 as described with reference to FIG. 7.

At 1515, the method may include receiving control signaling identifying a set of indices including a first subset of indices and second subset of indices, where first each index of the subset of indices corresponds to a combination of a positive acknowledgement and a first quantization level associated with the first target block error rate, and each index of the second subset of indices corresponds to a combination of a negative acknowledgement and a second quantization level associated with the second target block error rate. The operations of 1515 may be performed in accordance with examples as disclosed herein. In some examples, aspects of the operations of 1515 may be performed by an indexing component 745 as described with reference to FIG. 7.

At 1520, the method may include receiving a data signal from the base station, the received data signal associated with one of the positive acknowledgement or the negative acknowledgement. The operations of 1520 may be performed in accordance with examples as disclosed herein. In some examples, aspects of the operations of 1520 may be performed by a data signal reception component 750 as described with reference to FIG. 7.

At 1525, the method may include selecting, based on the received reference signals and the one of the positive acknowledgement or the negative acknowledgement, an index of the set of indices corresponding to the positive acknowledgement and the first quantization level corresponding to the first channel state information based on the received reference signals or corresponding to the negative acknowledgement and the second quantization level corresponding to the second channel state information based on the received reference signals, where one of the first channel state information or the second channel state information includes the selected index. The operations of 1525 may be performed in accordance with examples as disclosed herein. In some examples, aspects of the operations of 1525 may be performed by an indexing component 745 as described with reference to FIG. 7.

At 1530, the method may include transmitting, to the base station, the channel state information reporting that includes first channel state information for the first target block error rate and second channel state information for the second target block error rate, each of the first channel state information and the second channel state information based on the received reference signals. The operations of 1530 may be performed in accordance with examples as disclosed herein. In some examples, aspects of the operations of 1530 may be performed by a CSI transmission component 735 as described with reference to FIG. 7.

Figure 16:
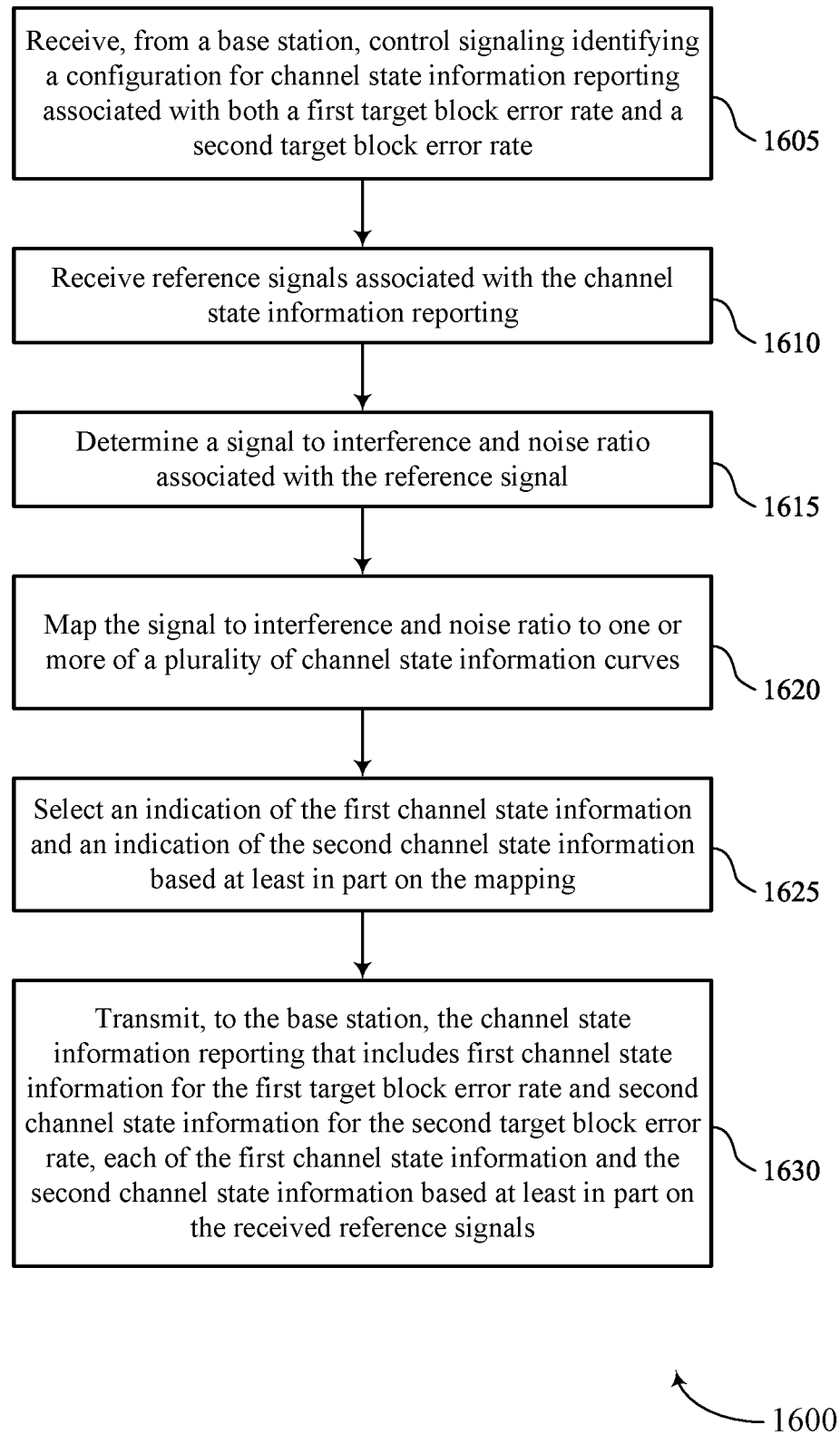

FIG. 16 shows a flowchart illustrating a method 1600 that supports multiple data channel-based channel state information reports in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling identifying a configuration for channel state information reporting associated with both a first target block error rate and a second target block error rate. The operations of 1605 may be performed in accordance with examples as disclosed herein. In some examples, aspects of the operations of 1605 may be performed by a configuration reception component 725 as described with reference to FIG. 7.

At 1610, the method may include receiving reference signals associated with the channel state information reporting. The operations of 1610 may be performed in accordance with examples as disclosed herein. In some examples, aspects of the operations of 1610 may be performed by a reference signal reception component 730 as described with reference to FIG. 7.

At 1615, the method may include determining a signal to interference and noise ratio associated with the reference signal. The operations of 1615 may be performed in accordance with examples as disclosed herein. In some examples, aspects of the operations of 1615 may be performed by an SINR component 760 as described with reference to FIG. 7.

At 1620, the method may include mapping the signal to interference and noise ratio to one or more of a set of multiple channel state information curves. The operations of 1620 may be performed in accordance with examples as disclosed herein. In some examples, aspects of the operations of 1620 may be performed by an SINR component 760 as described with reference to FIG. 7.

At 1625, the method may include selecting an indication of the first channel state information and an indication of the second channel state information based on the mapping. The operations of 1625 may be performed in accordance with examples as disclosed herein. In some examples, aspects of the operations of 1625 may be performed by a CSI determination component 755 as described with reference to FIG. 7.

At 1630, the method may include transmitting, to the base station, the channel state information reporting that includes first channel state information for the first target block error rate and second channel state information for the second target block error rate, each of the first channel state information and the second channel state information based on the received reference signals. The operations of 1630 may be performed in accordance with examples as disclosed herein. In some examples, aspects of the operations of 1630 may be performed by a CSI transmission component 735 as described with reference to FIG. 7.

Figure 17:
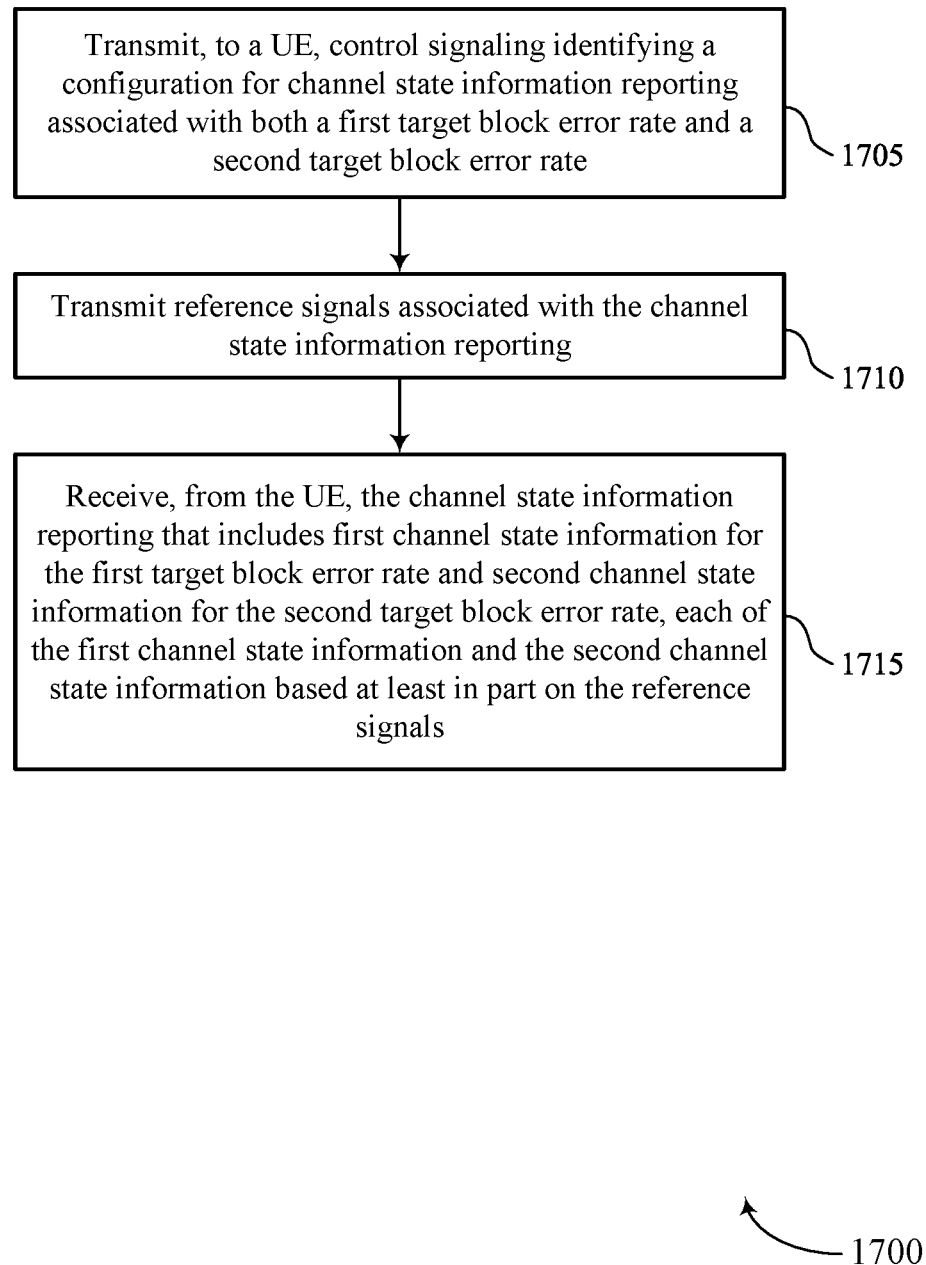

FIG. 17 shows a flowchart illustrating a method 1700 that supports multiple data channel-based channel state information reports in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling identifying a configuration for channel state information reporting associated with both a first target block error rate and a second target block error rate. The operations of 1705 may be performed in accordance with examples as disclosed herein. In some examples, aspects of the operations of 1705 may be performed by a control signaling transmission element 1125 as described with reference to FIG. 11.

At 1710, the method may include transmitting reference signals associated with the channel state information reporting. The operations of 1710 may be performed in accordance with examples as disclosed herein. In some examples, aspects of the operations of 1710 may be performed by a reference signal element 1130 as described with reference to FIG. 11.

At 1715, the method may include receiving, from the UE, the channel state information reporting that includes first channel state information for the first target block error rate and second channel state information for the second target block error rate, each of the first channel state information and the second channel state information based on the reference signals. The operations of 1715 may be performed in accordance with examples as disclosed herein. In some examples, aspects of the operations of 1715 may be performed by a CSI reception element 1135 as described with reference to FIG. 11.

The following provides an overview of aspects of the present disclosure:

Aspect 1: A method for wireless communications at a UE, comprising: receiving, from a base station, control signaling identifying a configuration for channel state information reporting associated with both a first target block error rate and a second target block error rate; receiving reference signals associated with the channel state information reporting; and transmitting, to the base station, the channel state information reporting that includes first channel state information for the first target block error rate and second channel state information for the second target block error rate, each of the first channel state information and the second channel state information based at least in part on the received reference signals.

Aspect 2: The method of aspect 1, wherein receiving the control signaling indicating the configuration comprises: receiving control signaling identifying a first set of thresholds for the first target block error rate for the channel state information reporting and a second set of thresholds for the second target block error rate for the channel state information reporting.

Aspect 3: The method of any of aspects 1 through 2, further comprising: receiving control signaling identifying the first target block error rate and the second target block error rate.

Aspect 4: The method of any of aspects 1 through 3, further comprising: receiving control signaling identifying a set of indices and a set of target block error rates, each index of the set of indices indicating one or more target block error rates of the set of target block error rates, wherein receiving the control signaling indicating the configuration for the channel state information reporting comprises: receiving control signaling identifying an index of the set of indices, the index corresponding to the first target block error rate and the second target block error rate of the set of target block error rates.

Aspect 5: The method of any of aspects 1 through 4, further comprising: receiving control signaling identifying a set of indices, each index of the set of indices corresponding to a combination of a positive or negative acknowledgment, a first quantization level associated with the first target block error rate, and a second quantization level associated with the second target block error rate; receiving a data signal from the base station; and selecting, based at least in part on the received reference signals and the received data signal, an index of the set of indices corresponding to the first quantization level, the first quantization level corresponding to the first channel state information based at least in part on the received reference signals, the second quantization level corresponding to the second channel state information based at least in part on the received reference signals, and one of a positive or negative acknowledgment associated with the received data signal, wherein the first channel state information and the second channel state information comprise the selected index.

Aspect 6: The method of any of aspects 1 through 5, further comprising: receiving control signaling identifying a set of indices including a first subset of indices and second subset of indices, wherein each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate; receiving a data signal from the base station, the received data signal associated with one of the positive acknowledgement or the negative acknowledgement; and selecting, based at least in part on the received reference signals and the one of the positive acknowledgement or the negative acknowledgement, an index of the set of indices corresponding to the positive acknowledgement and the first quantization level corresponding to the first channel state information based at least in part on the received reference signals or corresponding to the negative acknowledgement and the second quantization level corresponding to the second channel state information based at least in part on the received reference signals, wherein one of the first channel state information or the second channel state information comprises the selected index.

Aspect 7: The method of any of aspects 1 through 6, further comprising: selecting a first quantization level as the first channel state information based at least in part on the first target block error rate and one or more block error rate thresholds; and selecting a second quantization level as the second channel state information based at least in part on the second target block error rate and the one or more block error rate thresholds.

Aspect 8: The method of any of aspects 1 through 7, further comprising: determining a signal to interference and noise ratio associated with the reference signal; mapping the signal to interference and noise ratio to one or more of a plurality of channel state information curves; and selecting an indication of the first channel state information and an indication of the second channel state information based at least in part on the mapping.

Aspect 9: The method of any of aspects 1 through 8, further comprising: receiving a request for the first channel state information and the second channel state information, the request received in a radio resource control message, a medium access control control element message, or a downlink control information message.

Aspect 10: The method of any of aspects 1 through 9, wherein the reference signal is a channel state information reference signal or a demodulation reference signal.

Aspect 11: A method for wireless communications at a base station, comprising: transmitting, to a UE, control signaling identifying a configuration for channel state information reporting associated with both a first target block error rate and a second target block error rate; transmitting reference signals associated with the channel state information reporting; and receiving, from the UE, the channel state information reporting that includes first channel state information for the first target block error rate and second channel state information for the second target block error rate, each of the first channel state information and the second channel state information based at least in part on the reference signals.

Aspect 12: The method of aspect 11, wherein transmitting the control signaling indicating the configuration comprises: transmitting, the UE, control signaling identifying a first set of thresholds for the first target block error rate for the channel state information reporting and a second set of thresholds for the second target block error rate for the channel state information reporting.

Aspect 13: The method of any of aspects 11 through 12, further comprising: transmitting control signaling identifying the first target block error rate and the second target block error rate.

Aspect 14: The method of any of aspects 11 through 13, further comprising: transmitting, to the UE, control signaling identifying a set of indices and a set of target block error rates, each index of the set of indices indicating one or more target block error rates of the set of target block error rates, wherein transmitting the control signaling indicating the configuration for the channel state information reporting comprises: transmitting control signaling identifying an index of the set of indices, the index corresponding to the first target block error rate and the second target block error rate of the set of target block error rates.

Aspect 15: The method of any of aspects 11 through 14, further comprising: transmitting, to the UE, control signaling identifying a set of indices, each index of the set of indices corresponding to a combination of a positive or negative acknowledgment, a first quantization level associated with the first target block error rate, and a second quantization level associated with the second target block error rate;

Aspect 16: The method of any of aspects 11 through 15, further comprising: transmitting, to the UE, control signaling identifying a set of indices including a first subset of indices and second subset of indices, wherein each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate;

Aspect 17: The method of any of aspects 11 through 16, further comprising: transmitting, to the UE, a request for the first channel state information and the second channel state information, the request transmitted in a radio resource control message, a medium access control control element message, or a downlink control information message.

Aspect 18: An apparatus for wireless communications at a UE, comprising: a processor; memory coupled with the processor; and instructions stored in the memory and executable by the processor to cause the apparatus to perform a method of any of aspects 1 through 10.

Aspect 19: An apparatus for wireless communications at a UE, comprising at least one means for performing a method of any of aspects 1 through 10.

Aspect 20: A non-transitory computer-readable medium storing code for wireless communications at a UE, the code comprising instructions executable by a processor to perform a method of any of aspects 1 through 10.

Aspect 21: An apparatus for wireless communications at a base station, comprising a processor; memory coupled with the processor; and instructions stored in the memory and executable by the processor to cause the apparatus to perform a method of any of aspects 11 through 17.

Aspect 22: An apparatus for wireless communications at a base station, comprising at least one means for performing a method of any of aspects 11 through 17.

Aspect 23: A non-transitory computer-readable medium storing code for wireless communications at a base station, the code comprising instructions executable by a processor to perform a method of any of aspects 11 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling identifying a set of indices and a set of target block error rates, each index of the set of indices indicating one or more target block error rates of the set of target block error rates;
   receiving, from a base station, control signaling identifying a configuration for channel state information reporting associated with both a first target block error rate and a second target block error rate and an index of the set of indices, the index corresponding to the first target block error rate and the second target block error rate of the set of target block error rates;
   receiving reference signals associated with the channel state information reporting; and
   transmitting, to the base station, the channel state information reporting that includes first channel state information for the first target block error rate and second channel state information for the second target block error rate, each of the first channel state information and the second channel state information based at least in part on the received reference signals.

2. The method of claim 1, wherein receiving the control signaling indicating the configuration comprises:
   receiving control signaling identifying a first set of thresholds for the first target block error rate for the channel state information reporting and a second set of thresholds for the second target block error rate for the channel state information reporting.

3. The method of claim 1, further comprising:
   receiving control signaling identifying the first target block error rate and the second target block error rate.

4. The method of claim 1, further comprising:
   receiving control signaling identifying a set of indices, each index of the set of indices corresponding to a combination of a positive or negative acknowledgment, a first quantization level associated with the first target block error rate, and a second quantization level associated with the second target block error rate;
   receiving a data signal from the base station; and
   selecting, based at least in part on the received reference signals and the received data signal, an index of the set of indices corresponding to the first quantization level, the first quantization level corresponding to the first channel state information based at least in part on the received reference signals, the second quantization level corresponding to the second channel state information based at least in part on the received reference signals, and one of a positive or negative acknowledgment associated with the received data signal, wherein the first channel state information and the second channel state information comprise the selected index.

5. The method of claim 1, further comprising:
   receiving control signaling identifying a set of indices including a first subset of indices and second subset of indices, wherein each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate;
   receiving a data signal from the base station, the received data signal associated with one of the positive acknowledgement or the negative acknowledgement; and
   selecting, based at least in part on the received reference signals and the one of the positive acknowledgement or the negative acknowledgement, an index of the set of indices corresponding to the positive acknowledgement and the first quantization level corresponding to the first channel state information based at least in part on the received reference signals or corresponding to the negative acknowledgement and the second quantization level corresponding to the second channel state information based at least in part on the received reference signals, wherein one of the first channel state information or the second channel state information comprises the selected index.

6. The method of claim 1, further comprising:
   selecting a first quantization level as the first channel state information based at least in part on the first target block error rate and one or more block error rate thresholds; and
   selecting a second quantization level as the second channel state information based at least in part on the second target block error rate and the one or more block error rate thresholds.

7. The method of claim 1, further comprising:
   determining a signal to interference and noise ratio associated with each reference signal;
   mapping the signal to interference and noise ratio to one or more of a plurality of channel state information curves; and
   selecting an indication of the first channel state information and an indication of the second channel state information based at least in part on the mapping.

8. The method of claim 1, further comprising:
   receiving a request for the first channel state information and the second channel state information, the request received in a radio resource control message, a medium access control control element message, or a downlink control information message.

9. The method of claim 1, wherein each reference signal is a channel state information reference signal or a demodulation reference signal.

10. A method for wireless communications at a base station, comprising:
- transmitting, to a user equipment (UE), control signaling identifying a set of indices and a set of target block error rates, each index of the set of indices indicating one or more target block error rates of the set of target block error rates;
- transmitting, to the UE, control signaling identifying a configuration for channel state information reporting associated with both a first target block error rate and a second target block error rate and an index of the set of indices, the index corresponding to the first target block error rate and the second target block error rate of the set of target block error rates;
- transmitting reference signals associated with the channel state information reporting; and
- receiving, from the UE, the channel state information reporting that includes first channel state information for the first target block error rate and second channel state information for the second target block error rate, each of the first channel state information and the second channel state information based at least in part on the reference signals.

11. The method of claim 10, wherein transmitting the control signaling indicating the configuration comprises:
- transmitting, to the UE, control signaling identifying a first set of thresholds for the first target block error rate for the channel state information reporting and a second set of thresholds for the second target block error rate for the channel state information reporting.

12. The method of claim 10, further comprising:
- transmitting control signaling identifying the first target block error rate and the second target block error rate.

13. The method of claim 10, further comprising:
- transmitting, to the UE, control signaling identifying a set of indices, each index of the set of indices corresponding to a combination of a positive or negative acknowledgment, a first quantization level associated with the first target block error rate, and a second quantization level associated with the second target block error rate.

14. The method of claim 10, further comprising:
- transmitting, to the UE, control signaling identifying a set of indices including a first subset of indices and second subset of indices, wherein each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate.

15. The method of claim 10, further comprising:
- transmitting, to the UE, a request for the first channel state information and the second channel state information, the request transmitted in a radio resource control message, a medium access control control element message, or a downlink control information message.

16. An apparatus for wireless communications at a user equipment (UE), comprising:
- a processor;
- memory coupled with the processor; and
- instructions stored in the memory and executable by the processor to cause the apparatus to:
  - receive control signaling identifying a set of indices and a set of target block error rates, each index of the set of indices indicating one or more target block error rates of the set of target block error rates;
  - receive, from a base station, control signaling identifying a configuration for channel state information reporting associated with both a first target block error rate and a second target block error rate and an index of the set of indices, the index corresponding to the first target block error rate and the second target block error rate of the set of target block error rates;
  - receive reference signals associated with the channel state information reporting; and
  - transmit, to the base station, the channel state information reporting that includes first channel state information for the first target block error rate and second channel state information for the second target block error rate, each of the first channel state information and the second channel state information based at least in part on the received reference signals.

17. The apparatus of claim 16, wherein the instructions to receive the control signaling indicating the configuration are executable by the processor to cause the apparatus to:
- receive control signaling identifying a first set of thresholds for the first target block error rate for the channel state information reporting and a second set of thresholds for the second target block error rate for the channel state information reporting.

18. The apparatus of claim 16, wherein the instructions are further executable by the processor to cause the apparatus to:
- receive control signaling identifying a set of indices, each index of the set of indices corresponding to a combination of a positive or negative acknowledgment, a first quantization level associated with the first target block error rate, and a second quantization level associated with the second target block error rate;
- receive a data signal from the base station; and
- select, based at least in part on the received reference signals and the received data signal, an index of the set of indices corresponding to the first quantization level, the first quantization level corresponding to the first channel state information based at least in part on the received reference signals, the second quantization level corresponding to the second channel state information based at least in part on the received reference signals, and one of a positive or negative acknowledgment associated with the received data signal, wherein the first channel state information and the second channel state information comprise the selected index.

19. The apparatus of claim 16, wherein the instructions are further executable by the processor to cause the apparatus to:
- receive control signaling identifying a set of indices including a first subset of indices and second subset of indices, wherein each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate;
- receive a data signal from the base station, the received data signal associated with one of the positive acknowledgement or the negative acknowledgement; and
- select, based at least in part on the received reference signals and the one of the positive acknowledgement or the negative acknowledgement, an index of the set of indices corresponding to the positive acknowledgement and the first quantization level corresponding to the first channel state information based at least in part on the received reference signals or corresponding to the negative acknowledgement and the second quantization level corresponding to the second channel state information based at least in part on the received reference signals, wherein one of the first channel state information or the second channel state information comprises the selected index.

20. The apparatus of claim 16, wherein the instructions are further executable by the processor to cause the apparatus to:
   select a first quantization level as the first channel state information based at least in part on the first target block error rate and one or more block error rate thresholds; and
   select a second quantization level as the second channel state information based at least in part on the second target block error rate and the one or more block error rate thresholds.

21. The apparatus of claim 16, wherein the instructions are further executable by the processor to cause the apparatus to:
   determine a signal to interference and noise ratio associated with each reference signal;
   map the signal to interference and noise ratio to one or more of a plurality of channel state information curves; and
   select an indication of the first channel state information and an indication of the second channel state information based at least in part on the mapping.

22. The apparatus of claim 16, wherein the instructions are further executable by the processor to cause the apparatus to:
   receive a request for the first channel state information and the second channel state information, the request received in a radio resource control message, a medium access control control element message, or a downlink control information message.

23. An apparatus for wireless communications at a base station, comprising:
   a processor;
   memory coupled with the processor; and
   instructions stored in the memory and executable by the processor to cause the apparatus to:
      transmit, to a user equipment (UE), control signaling identifying a set of indices and a set of target block error rates, each index of the set of indices indicating one or more target block error rates of the set of target block error rates;
      transmit, to the UE, control signaling identifying a configuration for channel state information reporting associated with both a first target block error rate and a second target block error rate and an index of the set of indices, the index corresponding to the first target block error rate and the second target block error rate of the set of target block error rates;
      transmit reference signals associated with the channel state information reporting; and
      receive, from the UE, the channel state information reporting that includes first channel state information for the first target block error rate and second channel state information for the second target block error rate, each of the first channel state information and the second channel state information based at least in part on the reference signals.

24. The apparatus of claim 23, wherein the instructions to transmit the control signaling indicating the configuration are executable by the processor to cause the apparatus to:
   transmit, to the UE, control signaling identifying a first set of thresholds for the first target block error rate for the channel state information reporting and a second set of thresholds for the second target block error rate for the channel state information reporting.

25. The apparatus of claim 23, wherein the instructions are further executable by the processor to cause the apparatus to:
   transmit, to the UE, control signaling identifying a set of indices, each index of the set of indices corresponding to a combination of a positive or negative acknowledgment, a first quantization level associated with the first target block error rate, and a second quantization level associated with the second target block error rate.

26. The apparatus of claim 23, wherein the instructions are further executable by the processor to cause the apparatus to:
   transmit, to the UE, control signaling identifying a set of indices including a first subset of indices and second subset of indices, wherein each index of the first subset of indices corresponds to a combination of a positive acknowledgement and a first quantization level associated with the first target block error rate, and each index of the second subset of indices corresponds to a combination of a negative acknowledgement and a second quantization level associated with the second target block error rate.

* * * * *